(12) United States Patent
Aoki et al.

(10) Patent No.: US 12,452,551 B2
(45) Date of Patent: Oct. 21, 2025

(54) INFORMATION PROCESSING APPARATUS, INFORMATION PROCESSING SYSTEM, INFORMATION PROCESSING METHOD, AND INFORMATION PROCESSING PROGRAM

(71) Applicant: Sony Group Corporation, Tokyo (JP)

(72) Inventors: Suguru Aoki, Tokyo (JP); Ryuta Satoh, Tokyo (JP); Keitaro Yamamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 158 days.

(21) Appl. No.: 18/003,158

(22) PCT Filed: Jun. 22, 2021

(86) PCT No.: PCT/JP2021/023507
§ 371 (c)(1),
(2) Date: Dec. 23, 2022

(87) PCT Pub. No.: WO2022/019025
PCT Pub. Date: Jan. 27, 2022

(65) Prior Publication Data
US 2023/0254600 A1 Aug. 10, 2023

(30) Foreign Application Priority Data
Jul. 20, 2020 (JP) .................................. 2020-123778

(51) Int. Cl.
*H04N 25/445* (2023.01)
*G02B 5/20* (2006.01)
(Continued)

(52) U.S. Cl.
CPC ........... *H04N 25/445* (2023.01); *G02B 5/208* (2013.01); *G02B 5/30* (2013.01); *H04N 25/11* (2023.01)

(58) Field of Classification Search
CPC .... H04N 25/445; H04N 25/11; H04N 25/134; H04N 23/12; G02B 5/208; G02B 5/30
See application file for complete search history.

(56) References Cited

U.S. PATENT DOCUMENTS

2018/0131881 A1 5/2018 Kobayashi
2018/0240823 A1* 8/2018 Tochigi .................. H04N 25/74

FOREIGN PATENT DOCUMENTS

JP 2013-146101 A 7/2013
JP 2017-46260 A 3/2017
(Continued)

OTHER PUBLICATIONS

International Search Report and Written Opinion mailed on Sep. 14, 2021, received for PCT Application PCT/JP2021/023507, filed on Jun. 22, 2021, 9 pages including English Translation.

*Primary Examiner* — Christopher K Peterson
(74) *Attorney, Agent, or Firm* — XSENSUS LLP

(57) ABSTRACT

An aspect of the present disclosure provides an information processing apparatus, an information processing system, an information processing method, and an information processing program which can suppress a decrease in a recognition rate of recognition processing even in a case where recognition processing is performed using data of a partial region of image data.
An information processing apparatus includes a reading unit that sets a readout pixel as a part of a pixel region in which a plurality of pixels is arranged in a two-dimensional array, and controls reading out of a pixel signal from the pixel
(Continued)

included in the pixel region; and a setting unit that sets the readout pixel on the basis of color filter array information of the pixel region.

19 Claims, 27 Drawing Sheets

(51) Int. Cl.
*G02B 5/30* (2006.01)
*H04N 25/11* (2023.01)

(56) References Cited

FOREIGN PATENT DOCUMENTS

| JP | 2017-112409 A | 6/2017 |
| JP | 2019103129 A | 6/2019 |
| JP | 2020-39123 A | 3/2020 |
| JP | 2020-39124 A | 3/2020 |
| WO | WO-2018211813 A1 | 11/2018 |
| WO | 2019/102698 A1 | 5/2019 |
| WO | WO-2020059050 A1 | 3/2020 |

* cited by examiner

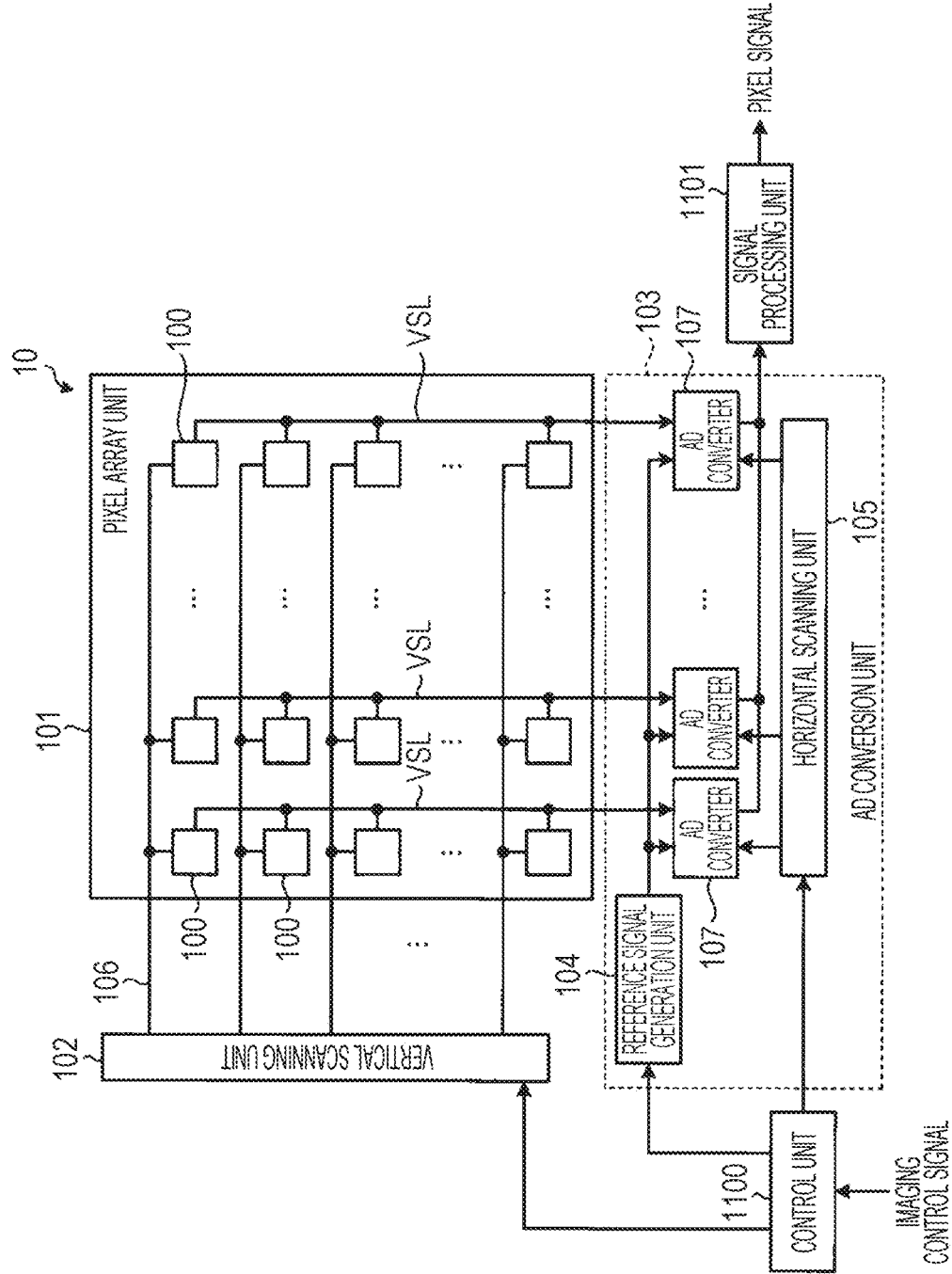

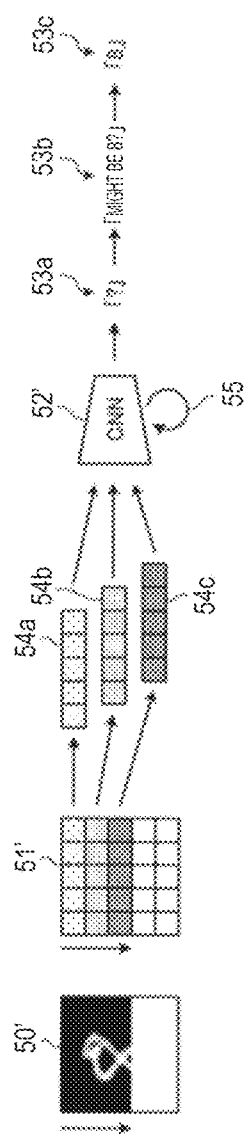

INFORMATION PROCESSING APPARATUS, INFORMATION PROCESSING SYSTEM, INFORMATION PROCESSING METHOD, AND INFORMATION PROCESSING PROGRAM

CROSS-REFERENCE TO RELATED APPLICATIONS

The present application is based on PCT filing PCT/JP2021/023507, filed Jun. 22, 2021, which claims priority to Japanese Patent Application No. 2020-123778, filed Jul. 20, 2020, the entire contents of each are incorporated herein by reference.

TECHNICAL FIELD

The present disclosure relates to an information processing apparatus, an information processing system, an information processing method, and an information processing program.

BACKGROUND ART

In recent years, with an increase in performance of imaging devices such as digital still cameras, digital video cameras, and small cameras mounted on multifunctional mobile phones (smartphones) and the like, information processing apparatuses equipped with an image recognition function for recognizing a predetermined object included in a captured image have been developed. Furthermore, a color filter such as a Bayer array is arranged in a sensor of the imaging device.

However, in a case where recognition processing is performed using data of a partial region of the image data, the position, the number, and the like of the filters included in each region are different, and there is a possibility that a recognition rate of the recognition processing is decreased.

CITATION LIST

Patent Document

Patent Document 1: Japanese Patent Application Laid-Open No. 2017-112409

SUMMARY OF THE INVENTION

Problems to be Solved by the Invention

An aspect of the present disclosure provides an information processing apparatus, an information processing system, an information processing method, and an information processing program which can suppress a decrease in a recognition rate of recognition processing even in a case where recognition processing is performed using data of a partial region of image data.

Solutions to Problems

In order to solve the problem described above, an aspect of the present disclosure provides an information processing apparatus including a reading unit that sets a readout pixel as a part of a pixel region in which a plurality of pixels is arranged in a two-dimensional array, and controls reading out of a pixel signal from the pixel included in the pixel region; and a setting unit that sets the readout pixel on the basis of color filter array information of the pixel region.

The setting unit may set the readout pixel on the basis of external information.

The external information may be at least one of a recognition result, map information, vehicle information, or external sensor information.

The setting unit may set priorities respectively to at least two kinds of information among a recognition result, map information, vehicle information, and external sensor information, and set the readout pixel on the basis of the plurality of set priorities.

A polarizing filter may be arranged on at least one of the plurality of pixels, and the setting unit may set a priority of the pixel on which the polarizing filter is arranged, on the basis of at least one of the recognition result, the map information, the vehicle information, or the external sensor information.

A spectral filter may be arranged on at least one of the plurality of pixels, and the setting unit may set a priority of the pixel on which the spectral filter is arranged, on the basis of at least one of the recognition result, the map information, the vehicle information, or the external sensor information.

An infrared filter may be arranged on at least one of the plurality of pixels, and the setting unit may set a priority of the pixel on which the infrared filter is arranged, on the basis of at least one of the recognition result, the map information, the vehicle information, or the external sensor information.

An aspect of the present disclosure provides an information processing system including a sensor unit in which a plurality of pixels is arranged in a two-dimensional array; a sensor control unit that controls the sensor unit; and a recognition processing unit, in which the sensor control unit has a reading unit that sets a readout pixel as a part of a pixel region in which a plurality of pixels is arranged in a two-dimensional array, and controls reading out of a pixel signal from the pixel included in the pixel region, and the recognition processing unit has a setting unit that sets the readout pixel on the basis of color filter array information of the pixel region.

In order to solve the problem described above, an aspect of the present disclosure provides an information processing method including a reading step of setting a readout pixel as a part of a pixel region in which a plurality of pixels is arranged in a two-dimensional array, and controlling reading out of a pixel signal from the pixel included in the pixel region; and a setting step of setting the readout pixel on the basis of color filter array information of the pixel region.

In order to solve the problem described above, an aspect of the present disclosure provides a program causing a computer to execute a reading step of setting a readout pixel as a part of a pixel region in which a plurality of pixels is arranged in a two-dimensional array, and controlling reading out of a pixel signal from the pixel included in the pixel region; and a setting step of setting the readout pixel on the basis of color filter array information of the pixel region.

BRIEF DESCRIPTION OF DRAWINGS

FIG. 4 is a block diagram illustrating a configuration of an example of a sensor unit applicable to each embodiment.

FIG. 11 is a diagram for schematically describing image recognition processing of obtaining a recognition result from a part of an image as a recognition target.

FIG. 12A is a diagram schematically illustrating an example of identification processing by DNN in a case where time-series information is not used.

FIG. 17 is a diagram illustrating a problem in recognition processing in a case where color filters are arranged in a Bayer array.

FIG. 19 is a diagram schematically illustrating a case where sampling and reading out are performed in units of blocks.

FIG. 21 is a diagram illustrating an example of a pixel array unit in which R, G, and B pixels are arranged in a line in a direction orthogonal to a readout direction of line data.

FIG. 22 is a diagram illustrating an example in which G pixels are arranged in every other column and columns in which R and B pixels are alternately arranged are arranged between the columns in which the G pixels are arranged.

FIG. 23 is a diagram illustrating an example in which R, B, and G pixels are alternately arranged in columns and an arrangement order of R, B, and G pixels is different for each column.

FIG. 24 is a diagram illustrating an example in which R, B, and G pixels are alternately arranged in a column in the readout direction of the line data.

FIG. 25 is a diagram illustrating another readout method in FIG. 24.

FIG. 26 is a diagram illustrating an example of a case where a plurality of rows is simultaneously read out in FIG. 24.

FIG. 27 is a diagram illustrating an example in which R, B, G, and W pixels are alternately arranged in a column in the readout direction.

FIG. 28 is a diagram illustrating an example in which R, B, G, and W pixels are alternately arranged in every two columns.

FIG. 29 is a diagram illustrating an example in which R, B, G, and spectral pixels are alternately arranged in a column in the readout direction of the line data.

FIG. 31 is a diagram illustrating an example in which polarizing filters equivalent to those in an area A300 are arranged in a superimposed manner.

FIG. 34 is a diagram illustrating an example in which far-red pixels H having infrared filters are arranged in a part of an arrangement example of FIG. 27.

FIG. 35 is a diagram illustrating an example in which polarizing filters are further arranged on a part of an arrangement example of FIG. 24.

MODE FOR CARRYING OUT THE INVENTION

Hereinafter, embodiments of an information processing apparatus, an information processing system, an information processing method, and an information processing program will be described with reference to the drawings. Hereinafter, the main components of the information processing apparatus, the information processing system, the information processing method, and the information processing program will be mainly described, but the information processing apparatus, the information processing system, the information processing method, and the information processing program may have components and functions that are not illustrated or described. The following description does not exclude components and functions that are not illustrated or described.

Configuration Example According to Each Embodiment of Present Disclosure

Figure 1:
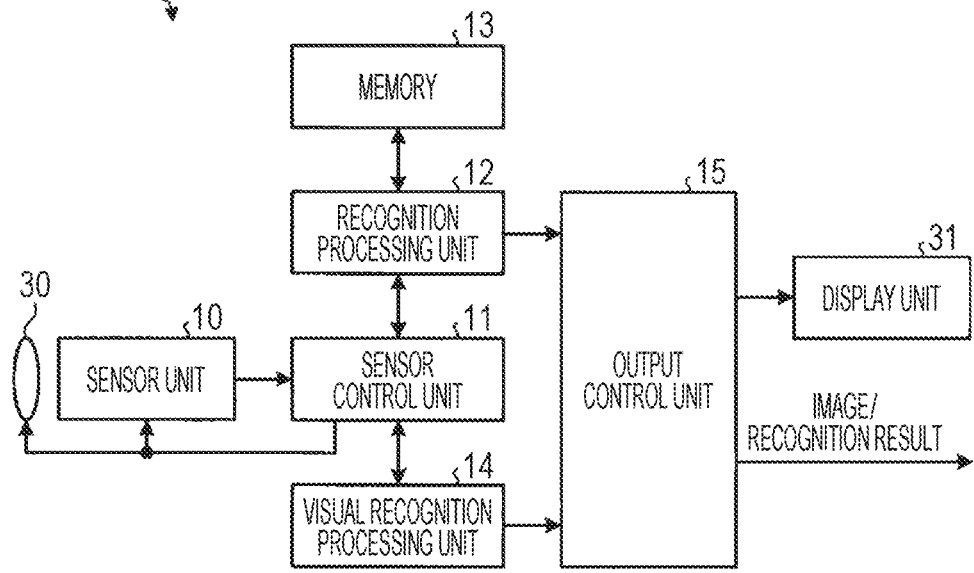
FIG. 1 is a block diagram illustrating a configuration of an example of an imaging device applicable to each embodiment of the present disclosure.

An overall configuration example of an information processing system according to each embodiment will be schematically described. FIG. 1 is a block diagram illustrating a configuration of an example of an information processing system 1. In FIG. 1, the information processing system 1 includes a sensor unit 10, a sensor control unit 11, a recognition processing unit 12, a memory 13, a visual recognition processing unit 14, and an output control unit 15. Each of these units is, for example, a complementary metal oxide semiconductor (CMOS) image sensor (CIS) integrally formed using a CMOS. Note that the information processing system 1 is not limited to this example, and may be another type of light sensor such as an infrared light sensor that performs imaging with infrared light. Furthermore, the sensor control unit 11, the recognition processing unit 12, the memory 13, the visual recognition processing unit 14, and the output control unit 15 constitute an information processing apparatus 1a.

The sensor unit 10 outputs a pixel signal corresponding to light emitted to a light receiving surface via an optical unit 30. More specifically, the sensor unit 10 has a pixel array in which pixels including at least one photoelectric conversion element are arranged in a matrix. The light receiving surface is formed by each pixel arranged in a matrix in the pixel array. Moreover, the sensor unit 10 includes a drive circuit for driving each pixel included in the pixel array, and a signal processing circuit that performs predetermined signal processing on a signal read out from each pixel and outputs the signal as a pixel signal of each pixel. The sensor unit 10 outputs the pixel signal of each pixel included in the pixel region as digital image data.

Hereinafter, in the pixel array of the sensor unit 10, a region in which effective pixels for generating the pixel signal are arranged is referred to as a frame. Frame image data is formed by pixel data based on each pixel signal output from each pixel included in the frame. Furthermore, each row in the array of pixels of the sensor unit 10 is referred to as a line, and line image data is formed by pixel data based on the pixel signal output from each pixel included in the line. Moreover, an operation in which the sensor unit 10 outputs the pixel signal according to the light emitted to the light receiving surface is referred to as imaging. The sensor unit 10 controls exposure at the time of imaging and a gain (analog gain) for a pixel signal in accordance with an imaging control signal supplied from the sensor control unit 11 as described later.

The sensor control unit 11 includes, for example, a microprocessor, controls the reading out of pixel data from the sensor unit 10, and outputs pixel data based on each pixel signal read out from each pixel included in the frame. The pixel data output from the sensor control unit 11 is supplied to the recognition processing unit 12 and the visual recognition processing unit 14.

Furthermore, the sensor control unit 11 generates the imaging control signal for controlling imaging in the sensor unit 10. The sensor control unit 11 generates the imaging control signal, for example, in accordance with instructions from the recognition processing unit 12 and the visual recognition processing unit 14 as described later. The imaging control signal includes information indicating the exposure at the time of imaging and the analog gain in the sensor unit 10 described above. Moreover, the imaging control signal includes a control signal (a vertical synchronization signal, a horizontal synchronization signal, or the like) used by the sensor unit 10 to perform an imaging operation. The sensor control unit 11 supplies the generated imaging control signal to the sensor unit 10.

The optical unit 30 is for emitting the light from a subject to the light receiving surface of the sensor unit 10, and is arranged at a position corresponding to the sensor unit 10, for example. The optical unit 30 includes, for example, a plurality of lenses, a diaphragm mechanism for adjusting the size of an opening for incident light, and a focus mechanism for adjusting a focal point of the light emitted to the light receiving surface. The optical unit 30 may further include a shutter mechanism (mechanical shutter) that adjusts the time during which the light is emitted to the light receiving surface. The diaphragm mechanism, the focus mechanism, and the shutter mechanism included in the optical unit 30 can be controlled by, for example, the sensor control unit 11. The present disclosure is not limited thereto, and the diaphragm and the focus in the optical unit 30 can also be controlled from the outside of the information processing system 1. Furthermore, the optical unit 30 can be configured integrally with the information processing system 1.

The recognition processing unit 12 performs recognition processing of an object included in an image based on the pixel data on the basis of the pixel data supplied from the sensor control unit 11. In the present disclosure, for example, the recognition processing unit 12 as a machine learning unit that performs the recognition processing using a deep neural network (DNN) is configured by a digital signal processor (DSP) reading out and executing a program learned in advance by teacher data and stored as a learning model in the memory 13. The recognition processing unit 12 can instruct the sensor control unit 11 to read out the pixel data necessary for the recognition processing from the sensor unit 10. The recognition result by the recognition processing unit 12 is supplied to the output control unit 15.

The visual recognition processing unit 14 executes processing for obtaining an image suitable for human visual recognition, on the pixel data supplied from the sensor control unit 11, and outputs image data including a group of pixel data, for example. For example, an image signal processor (ISP) reads out and executes a program stored in advance in a memory (not illustrated), thereby configuring the visual recognition processing unit 14.

For example, in a case where a color filter is provided for each pixel included in the sensor unit 10 and the pixel data has color information of red (R), green (G), and blue (B), the visual recognition processing unit 14 can execute demosaic processing, white balance processing, and the like. Furthermore, the visual recognition processing unit 14 can instruct the sensor control unit 11 to read out the pixel data necessary for visual recognition processing from the sensor unit 10. The image data subjected to the image processing of the pixel data by the visual recognition processing unit 14 is supplied to the output control unit 15.

The output control unit 15 includes, for example, a microprocessor, and outputs one or both of the recognition result supplied from the recognition processing unit 12 and the image data supplied as the visual recognition processing result from the visual recognition processing unit 14 to the outside of the information processing system 1. The output control unit can output the image data to, for example, a display unit 31 having a display device. Therefore, a user can visually recognize the image data displayed by the display unit 31. Note that the display unit 31 may be built in the information processing system 1 or may be an external configuration of the information processing system 1.

Figure 2A:
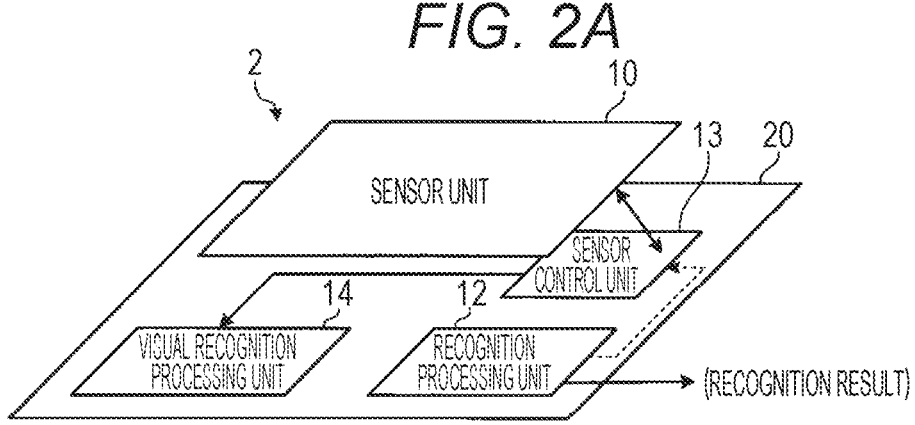
FIG. 2A is a schematic diagram illustrating an example of a hardware configuration of the imaging device according to each embodiment.
Figure 2B:
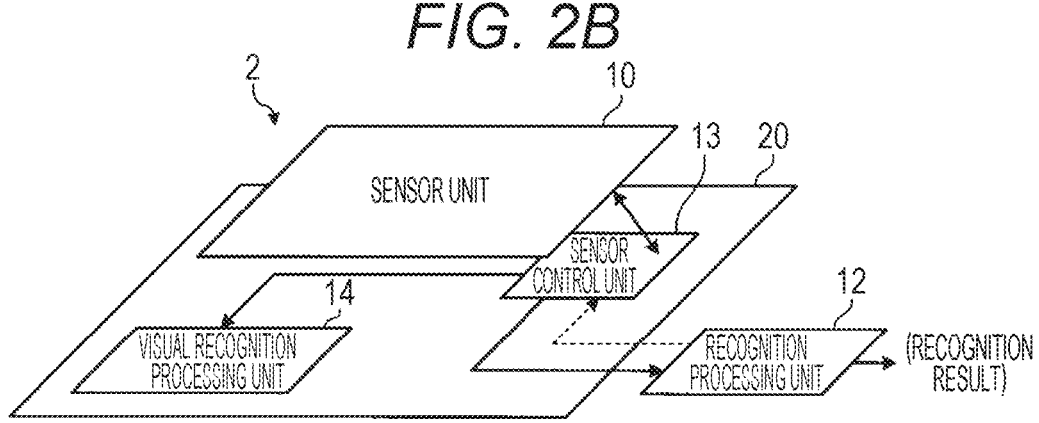
FIG. 2B is a schematic diagram illustrating an example of a hardware configuration of the imaging device according to each embodiment.

FIGS. 2A and 2B are schematic diagrams illustrating an example of a hardware configuration of the information processing system 1 according to each embodiment. FIG. 2A illustrates an example in which the sensor unit 10, the sensor control unit 11, the recognition processing unit 12, the memory 13, the visual recognition processing unit 14, and the output control unit 15 of the configuration illustrated in FIG. 1 are mounted on one chip 2. Note that, in FIG. 2A, the memory 13 and the output control unit 15 are omitted to avoid complexity.

In the configuration illustrated in FIG. 2A, the recognition result by the recognition processing unit 12 is output to the outside of the chip 2 via the output control unit 15 (not illustrated). Furthermore, in the configuration of FIG. 2A, the recognition processing unit 12 can acquire the pixel data to be used for recognition, from the sensor control unit 11 via the interface inside the chip 2.

FIG. 2B illustrates an example in which the sensor unit 10, the sensor control unit 11, the visual recognition processing unit 14, and the output control unit 15 of the configuration illustrated in FIG. 1 are mounted on one chip 2, and the recognition processing unit 12 and the memory 13 (not illustrated) are placed outside the chip 2. Also in FIG. 2B, similarly to FIG. 2A described above, the memory 13 and the output control unit 15 are omitted to avoid complexity.

In the configuration of FIG. 2B, the recognition processing unit 12 acquires pixel data to be used for recognition, via the interface for performing communication between chips. Furthermore, in FIG. 2B, the recognition result by the recognition processing unit 12 is illustrated to be directly output from the recognition processing unit 12 to the outside, but the present disclosure is not limited to this example. That is, in the configuration of FIG. 2B, the recognition processing unit 12 may return the recognition result to the chip 2 and output the recognition result from the output control unit 15 (not illustrated) mounted on the chip 2.

In the configuration illustrated in FIG. 2A, the recognition processing unit 12 is mounted on the chip 2 together with the sensor control unit 11, and communication between the recognition processing unit 12 and the sensor control unit 11 can be executed at a high speed by an interface inside the chip 2. On the other hand, in the configuration illustrated in FIG. 2A, the recognition processing unit 12 cannot be replaced, and it is difficult to change the recognition processing. On the other hand, in the configuration illustrated in FIG. 2B, since the recognition processing unit 12 is provided outside the chip 2, communication between the recognition processing unit 12 and the sensor control unit 11 needs to be performed via an interface between the chips. Therefore, the communication between the recognition processing unit 12 and the sensor control unit 11 is slower than the configuration in FIG. 2A, and there is a possibility that a delay occurs in control. On the other hand, the replacement of the recognition processing unit 12 is easy, and various kinds of recognition processing can be realized.

Hereinafter, unless otherwise specified, the information processing system 1 adopts a configuration in which the sensor unit 10, the sensor control unit 11, the recognition processing unit 12, the memory 13, the visual recognition processing unit 14, and the output control unit 15 are mounted on one chip 2 in FIG. 2A.

In the configuration illustrated in FIG. 2A described above, the information processing system 1 can be formed on one substrate. The present disclosure is not limited thereto, and the information processing system 1 may be a stacked CIS in which a plurality of semiconductor chips is stacked and integrally formed.

Figure 3A:
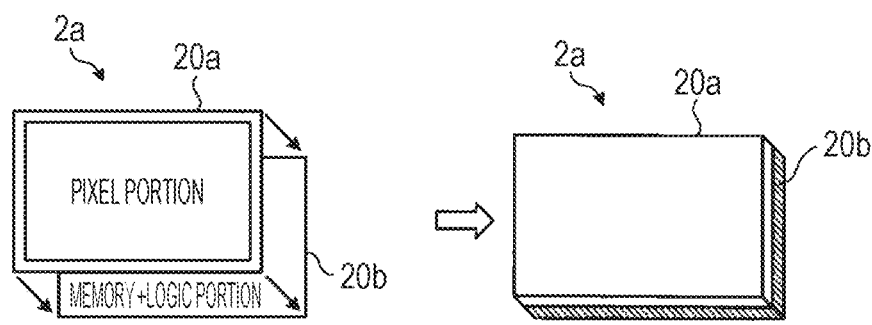
FIG. 3A is a diagram illustrating an example in which the imaging device according to each embodiment is formed by a stacked CIS having a two-layer structure.

As an example, the information processing system 1 can be formed with a two-layer structure in which semiconductor chips are stacked in two layers. FIG. 3A is a diagram illustrating an example in which the information processing system 1 according to each embodiment is formed by the stacked CIS having a two-layer structure. In the structure of FIG. 3A, a pixel portion 20a is formed in the semiconductor chip of a first layer, and a memory+logic portion 20b is formed in the semiconductor chip of a second layer. The pixel portion 20a includes at least a pixel array in the sensor unit 10. The memory+logic portion 20b includes, for example, the sensor control unit 11, the recognition processing unit 12, the memory 13, the visual recognition processing unit 14, the output control unit 15, and an interface for performing communication between the information processing system 1 and the outside. Moreover, the memory+logic portion 20b includes a part or all of a drive circuit that drives the pixel array in the sensor unit 10. Furthermore, although not illustrated, the memory+logic portion 20b can further include, for example, a memory used by the visual recognition processing unit 14 to process the image data.

As illustrated on the right side of FIG. 3A, the information processing system 1 is configured as one solid-state imaging element by bonding the semiconductor chip of the first layer and the semiconductor chip of the second layer while electrically contacting each other.

Figure 3B:
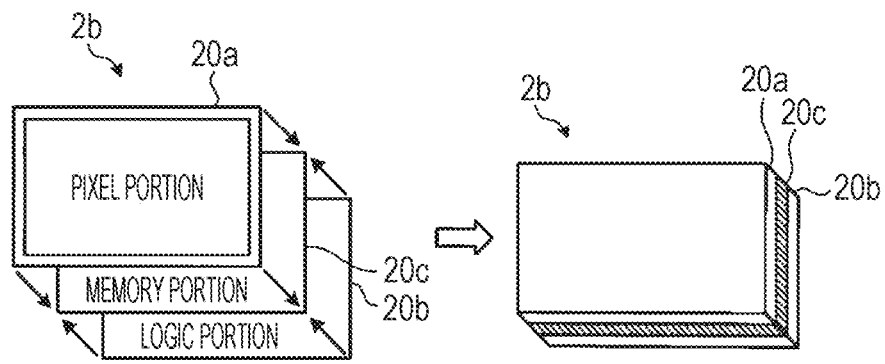
FIG. 3B is a diagram illustrating an example in which the imaging device according to each embodiment is formed by a stacked CIS having a three-layer structure.

As another example, the information processing system 1 can be formed with a three-layer structure in which semiconductor chips are stacked in three layers. FIG. 3B is a diagram illustrating an example in which the information processing system 1 according to each embodiment is formed by the stacked CIS having a three-layer structure. In the structure of FIG. 3B, the pixel portion 20a is formed in the semiconductor chip of a first layer, a memory portion 20c is formed in the semiconductor chip of a second layer, and a logic portion 20b is formed in the semiconductor chip of a third layer. In this case, the logic portion 20b includes, for example, the sensor control unit 11, the recognition processing unit 12, the visual recognition processing unit 14, the output control unit 15, and an interface for performing communication between the information processing system 1 and the outside. Furthermore, the memory portion 20c can include the memory 13, and a memory used by the visual recognition processing unit 14 to process the image data, for example. The memory 13 may be included in the logic portion 20b.

As illustrated on the right side of FIG. 3B, the information processing system 1 is configured as one solid-state imaging element by bonding the semiconductor chip of the first layer, the semiconductor chip of the second layer, and the semiconductor chip of the third layer while electrically contacting each other.

FIG. 4 is a block diagram illustrating a configuration of an example of the sensor unit 10 applicable to each embodiment. In FIG. 4, the sensor unit 10 includes a pixel array unit 101, a vertical scanning unit 102, an analog to digital (AD) conversion unit 103, a pixel signal line 106, a vertical signal line VSL, a control unit 1100, and a signal processing unit 1101. Note that, in FIG. 4, the control unit 1100 and the signal processing unit 1101 can also be included in the sensor control unit 11 illustrated in FIG. 1, for example.

The pixel array unit 101 includes a plurality of pixel circuits 100 including, for example, a photoelectric conversion element by a photodiode that performs photoelectric conversion on the received light, and a circuit that reads out electric charge from the photoelectric conversion element. In the pixel array unit 101, the plurality of pixel circuits 100 is arranged in a matrix in a horizontal direction (row direction) and a vertical direction (column direction). In the pixel array unit 101, the arrangement of the pixel circuits 100 in the row direction is referred to as a line. For example, in a case where an image of one frame is formed with 1920 pixels×1080 lines, the pixel array unit 101 includes at least 1080 lines each including at least 1920 pixel circuits 100. The image (image data) of one frame is formed by the pixel signal read out from the pixel circuit 100 included in the frame.

Hereinafter, the operation of reading out the pixel signal from each pixel circuit 100 included in the frame in the sensor unit 10 will be described as reading out the pixel from the frame as appropriate. Furthermore, the operation of reading out the pixel signal from each pixel circuit 100 included in the line included in the frame will be described as, for example, reading out the line as appropriate.

Furthermore, in the pixel array unit 101, for the row and column of each pixel circuit 100, the pixel signal line 106 is connected to each row, and the vertical signal line VSL is connected to each column. An end of the pixel signal line 106 that is not connected to the pixel array unit 101 is connected to the vertical scanning unit 102. The vertical scanning unit 102 transmits the control signal such as a drive pulse at the time of reading out the pixel signal from the pixel, to the pixel array unit 101 via the pixel signal line 106 under the control of the control unit 1100 as described later. An end of the vertical signal line VSL that is not connected to the pixel array unit 101 is connected to the AD conversion unit 103. The pixel signal read out from the pixel is transmitted to the AD conversion unit 103 via the vertical signal line VSL.

The control of the reading out of the pixel signal from the pixel circuit 100 will be schematically described. The reading out of the pixel signal from the pixel circuit 100 is performed by transferring the electric charge accumulated in the photoelectric conversion element by the exposure to a floating diffusion layer (floating diffusion (FD)), and converting the electric charge transferred in the floating diffusion layer into a voltage. The voltage obtained by converting the electric charge in the floating diffusion layer is output to the vertical signal line VSL via an amplifier.

More specifically, in the pixel circuit 100, during the exposure, a space between the photoelectric conversion element and the floating diffusion layer is set to an off (open) state, and electric charges generated according to the light incident by the photoelectric conversion are accumulated in the photoelectric conversion element. After the exposure is completed, the floating diffusion layer and the vertical signal line VSL are connected according to a selection signal supplied via the pixel signal line 106. Moreover, the floating diffusion layer is connected to a supply line of a power supply voltage VDD or a black level voltage in a short period of time according to a reset pulse supplied via the pixel signal line 106, and the floating diffusion layer is reset. A voltage (referred to as a voltage A) of a reset level of the floating diffusion layer is output to the vertical signal line VSL. Thereafter, the space between the photoelectric conversion element and the floating diffusion layer is set to an on (closed) state by the transfer pulse supplied via the pixel signal line 106, and the electric charges accumulated in the photoelectric conversion element are transferred to the floating diffusion layer. A voltage (referred to as a voltage B) according to an electric charge amount of the floating diffusion layer is output to the vertical signal line VSL.

The AD conversion unit 103 includes an AD converter 107 provided for each vertical signal line VSL, a reference signal generation unit 104, and a horizontal scanning unit 105. The AD converter 107 is a column AD converter that performs AD conversion processing on each column (column) of the pixel array unit 101. The AD converter 107 performs the AD conversion processing on the pixel signal supplied from the pixel circuit 100 via the vertical signal line VSL, and generates two digital values (values respectively corresponding to the voltage A and the voltage B) for correlated double sampling (CDS) processing for noise reduction.

The AD converter 107 supplies the generated two digital values to the signal processing unit 1101. The signal processing unit 1101 performs the CDS processing on the basis of the two digital values supplied from the AD converter 107, and generates a pixel signal (pixel data) by the digital signal. The pixel data generated by the signal processing unit 1101 is output to the outside of the sensor unit 10.

The reference signal generation unit 104 generates, as a reference signal, a ramp signal used by each AD converter 107 to convert the pixel signal into two digital values on the basis of the control signal input from the control unit 1100. The ramp signal is a signal in which the level (voltage value) is decreased at a constant slope with respect to time, or a signal in which the level is decreased stepwise. The reference signal generation unit 104 supplies the generated ramp signal to each AD converter 107. The reference signal generation unit 104 is configured using, for example, a digital-to-analog converter (DAC) or the like.

In a case where a ramp signal of which the voltage drops stepwise according to a predetermined inclination is supplied from the reference signal generation unit 104, a counter starts counting according to a clock signal. A comparator compares the voltage of the pixel signal supplied from the vertical signal line VSL with the voltage of the ramp signal, and stops counting by the counter at timing when the voltage of the ramp signal exceeds the voltage of the pixel signal. The AD converter 107 converts the pixel signal by the analog signal into the digital value by outputting a value corresponding to a count value of the time when the counting is stopped.

The AD converter 107 supplies the generated two digital values to the signal processing unit 1101. The signal processing unit 1101 performs the CDS processing on the basis of the two digital values supplied from the AD converter 107, and generates a pixel signal (pixel data) by the digital signal. The pixel signal by the digital signal generated by the signal processing unit 1101 is output to the outside of the sensor unit 10.

Under the control of the control unit 1100, the horizontal scanning unit 105 performs selective scanning to select each AD converter 107 in a predetermined order, and thereby sequentially outputs each digital value temporarily held by each AD converter 107 to the signal processing unit 1101. The horizontal scanning unit 105 includes, for example, a shift register, an address decoder, and the like.

The control unit 1100 performs drive control of the vertical scanning unit 102, the AD conversion unit 103, the reference signal generation unit 104, the horizontal scanning unit 105, and the like in accordance with the imaging control signal supplied from the sensor control unit 11. The control unit 1100 generates various drive signals serving as references for the operations of the vertical scanning unit 102, the AD conversion unit 103, the reference signal generation unit 104, and the horizontal scanning unit 105. The control unit 1100 generates the control signal for the vertical scanning unit 102 to supply to each pixel circuit 100 via the pixel signal line 106 on the basis of, for example, the vertical synchronization signal or an external trigger signal included in the imaging control signal, and the horizontal synchronization signal. The control unit 1100 supplies the generated control signal to the vertical scanning unit 102.

Furthermore, the control unit 1100 outputs, for example, information indicating the analog gain included in the imaging control signal supplied from the sensor control unit 11, to the AD conversion unit 103. The AD conversion unit 103 controls the gain of the pixel signal input to each AD converter 107 included in the AD conversion unit 103 via the vertical signal line VSL according to the information indicating the analog gain.

On the basis of the control signal supplied from the control unit 1100, the vertical scanning unit 102 supplies various signals including the drive pulse to the pixel signal line 106 of the selected pixel row of the pixel array unit 101 to each pixel circuit 100 for each line, and causes each pixel circuit 100 to output the pixel signal to the vertical signal line VSL. The vertical scanning unit 102 includes, for example, a shift register, an address decoder, and the like. Furthermore, the vertical scanning unit 102 controls the exposure in each pixel circuit 100 according to the information indicating the exposure supplied from the control unit 1100.

The sensor unit 10 configured as described above is a column AD type complementary metal oxide semiconductor (CMOS) image sensor in which the AD converters 107 are arranged for each column.

Example of Existing Technology Applicable to Present Disclosure

Prior to describing each embodiment according to the present disclosure, an existing technology applicable to the present disclosure will be schematically described for easy understanding.

(2-1. Outline of Rolling Shutter)

Figure 5A:
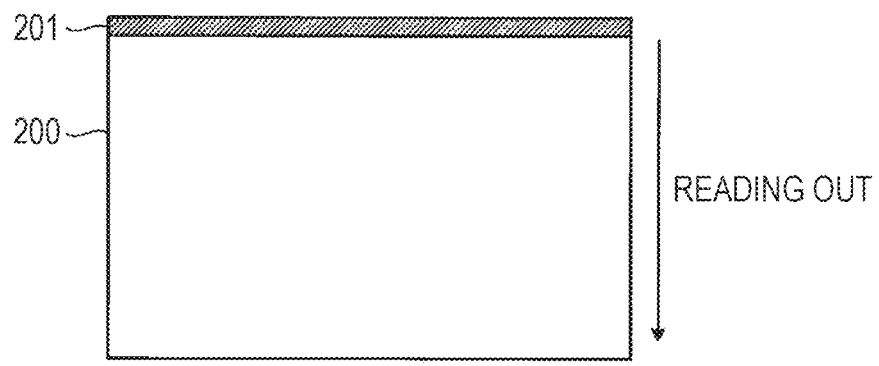
FIG. 5A is a schematic diagram for describing a rolling shutter method.
Figure 5B:
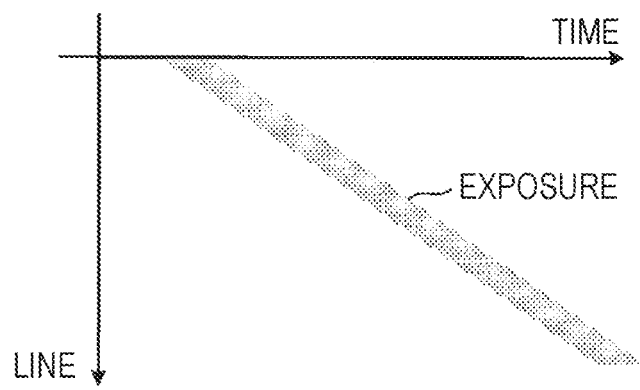
FIG. 5B is a schematic diagram for describing a rolling shutter method.
Figure 5C:
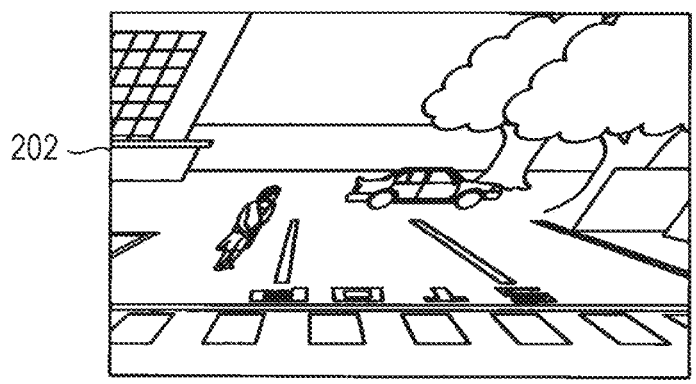
FIG. 5C is a schematic diagram for describing a rolling shutter method.

As an imaging method at the time of performing imaging by the pixel array unit 101, a rolling shutter (RS) method and a global shutter (GS) method are known. First, the rolling shutter method will be schematically described. FIGS. 5A, 5B, and 5C are schematic diagrams for describing the rolling shutter method. In the rolling shutter method, as illustrated in FIG. 5A, imaging is sequentially performed in units of lines from a line 201 at the upper end of a frame 200, for example.

Note that, it has been described above that "imaging" refers to the operation in which the sensor unit 10 outputs the pixel signal according to the light emitted to the light receiving surface. More specifically, "imaging" refers to a series of operations from performing exposure in a pixel to transferring the pixel signal based on the electric charge accumulated by the exposure in the photoelectric conversion element included in the pixel to the sensor control unit 11. Furthermore, as described above, the frame refers to a region in which the effective pixel circuit 100 for generating the pixel signal is arranged in the pixel array unit 101.

For example, in the configuration of FIG. 4, exposure is simultaneously executed in each pixel circuit 100 included in one line. After the exposure is ended, the pixel signals based on the electric charges accumulated by the exposure are simultaneously transferred in the respective pixel circuits 100 included in the line via the respective vertical signal lines VSL corresponding to the respective pixel circuits 100. By sequentially executing this operation in units of lines, imaging by the rolling shutter can be realized.

FIG. 5B schematically illustrates an example of a relationship between imaging and time in the rolling shutter method. In FIG. 5B, the vertical axis represents a line position, and the horizontal axis represents time. In the rolling shutter method, since the exposure in each line is sequentially performed line by line, as illustrated in FIG. 5B, the timing of the exposure in each line is sequentially deviated according to the position of the line. Accordingly, for example, in a case where a positional relationship between the information processing system 1 and the subject in the horizontal direction is changed at a high speed, distortion occurs in the captured image of the frame 200 as illustrated in FIG. 5C. In the example of FIG. 5C, an image 202 corresponding to the frame 200 is an image inclined at an angle according to the speed of the change and the direction of the change of the positional relationship between the information processing system 1 and the subject in the horizontal direction.

Figure 6A:
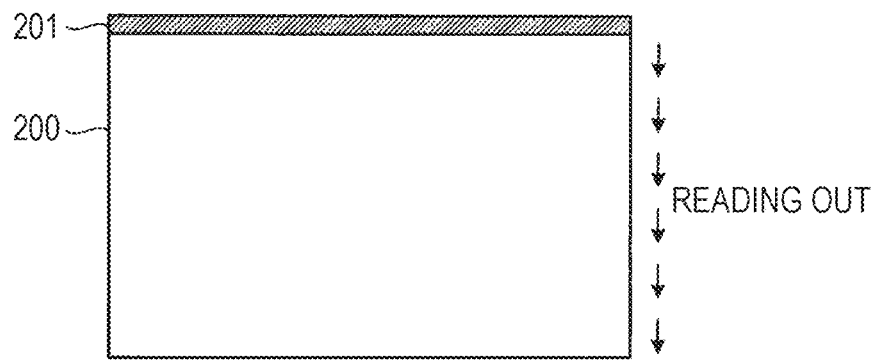
FIG. 6A is a schematic diagram for describing line thinning in the rolling shutter method.
Figure 6B:
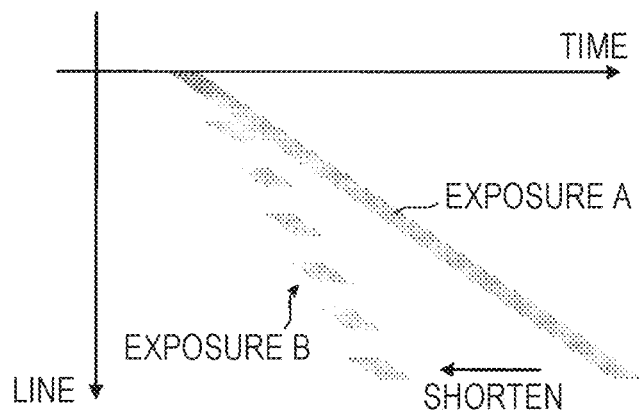
FIG. 6B is a schematic diagram for describing line thinning in the rolling shutter method.
Figure 6C:
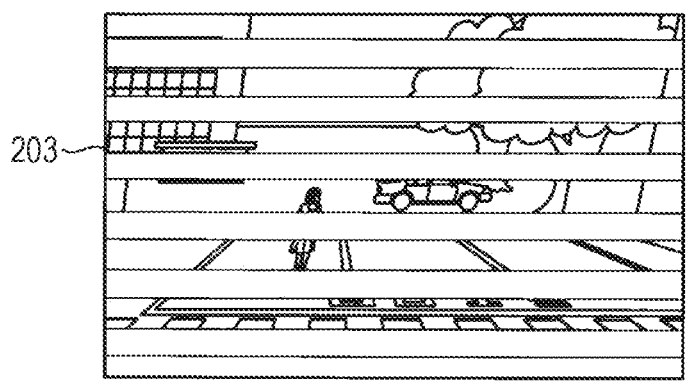
FIG. 6C is a schematic diagram for describing line thinning in the rolling shutter method.

In the rolling shutter method, it is also possible to perform imaging by thinning out lines. FIGS. 6A, 6B, and 6C are schematic diagrams for describing line thinning in the rolling shutter method. As illustrated in FIG. 6A, similarly to the example of FIG. 5A described above, imaging is performed in units of lines from the line 201 at the upper end of the frame 200 toward the lower end of the frame 200. At this time, imaging is performed while skipping the line every predetermined number.

Here, for the sake of description, it is assumed that imaging is performed every other line by one-line thinning. That is, after the imaging of the n-th line, the imaging of the (n+2)-th line is performed. At this time, it is assumed that the time from the imaging of the n-th line to the imaging of the (n+2)-th line is equal to the time from the imaging of the n-th line to the imaging of the (n+1)-th line in a case where thinning is not performed.

FIG. 6B schematically illustrates an example of a relationship between imaging and time in a case where one-line thinning is performed in the rolling shutter method. In FIG. 6B, the vertical axis represents a line position, and the horizontal axis represents time. In FIG. 6B, exposure A corresponds to the exposure in FIG. 5B in which thinning is not performed, and exposure B indicates the exposure in a case where one-line thinning is performed. As illustrated in the exposure B, by performing line thinning, it is possible to shorten the deviation in the timing of the exposure at the same line position as compared with a case where line thinning is not performed. Accordingly, as illustrated as an image 203 in FIG. 6C, the distortion in the inclination direction occurring in the captured image of the frame 200 is smaller than the case where the line thinning illustrated in FIG. 5C is not performed. On the other hand, in a case where line thinning is performed, the resolution of the image is lower than that in a case where line thinning is not performed.

Figure 7A:
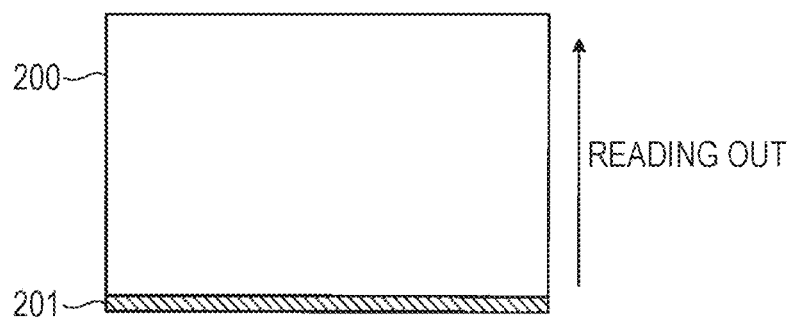
FIG. 7A is a diagram schematically illustrating an example of another imaging method in the rolling shutter method.
Figure 7B:
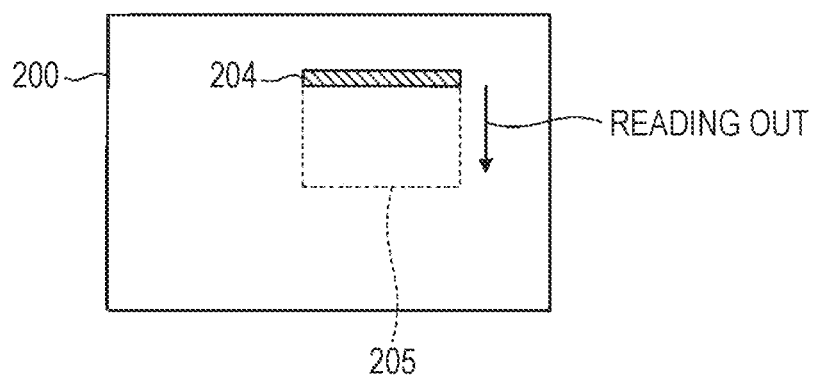
FIG. 7B is a diagram schematically illustrating an example of another imaging method in the rolling shutter method.

In the above description, an example has been described in which the imaging is sequentially performed line by line from the upper end toward the lower end of the frame 200 in the rolling shutter method, but the present disclosure is not limited to this example. FIGS. 7A and 7B are diagrams schematically illustrating an example of another imaging method in the rolling shutter method. For example, as illustrated in FIG. 7A, in the rolling shutter method, imaging can be sequentially performed line by line from the lower end toward the upper end of the frame 200. In this case, the orientation of the distortion of the image 202 in the horizontal direction is reversed as compared with the case where the imaging is sequentially performed line by line from the upper end toward the lower end of the frame 200.

Furthermore, for example, by setting a range of the vertical signal line VSL to which the pixel signal is transferred, it is also possible to selectively read out a part of the line. Moreover, by setting each of the line for performing imaging and the vertical signal line VSL for transferring the pixel signal, the lines for starting and ending imaging can be set to other than the upper end and the lower end of the frame 200. FIG. 7B schematically illustrates an example in which a rectangular region 205 of which the width and height are less than the width and height of the frame 200 is set as a range for imaging. In the example of FIG. 7B, imaging is sequentially performed line by line from a line 204 at the upper end of the region 205 toward the lower end of the region 205.

(2-2. Outline of Global Shutter)

Figure 8A:
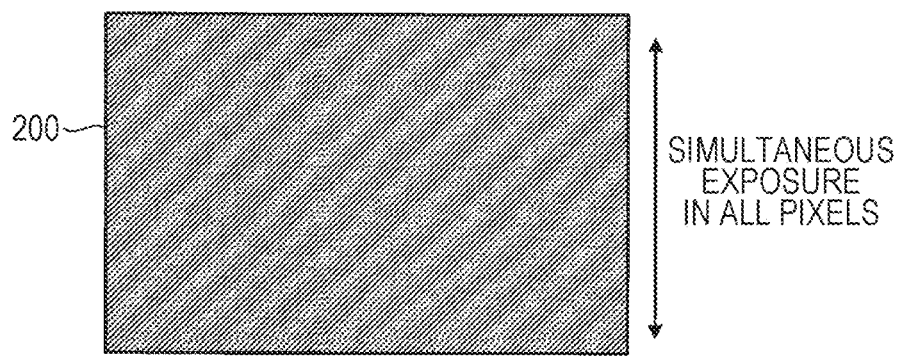
FIG. 8A is a schematic diagram for describing a global shutter method.
Figure 8B:
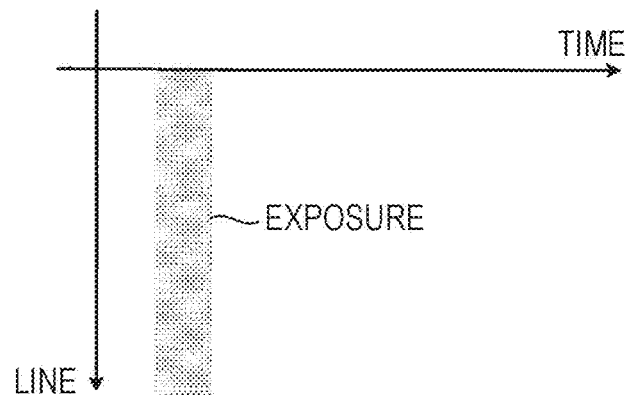
FIG. 8B is a schematic diagram for describing a global shutter method.
Figure 8C:
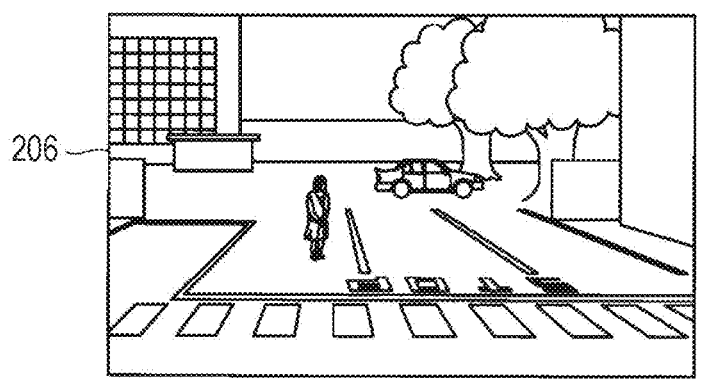
FIG. 8C is a schematic diagram for describing a global shutter method.

Next, a global shutter (GS) method will be schematically described as an imaging method at the time of performing the imaging by the pixel array unit 101. FIGS. 8A, 8B, and 8C are schematic diagrams for describing the global shutter method. In the global shutter method, as illustrated in FIG. 8A, exposure is simultaneously performed in the pixel circuits 100 included in the frame 200.

In a case where the global shutter method is realized in the configuration of FIG. 4, as an example, it is conceivable to have a configuration in which a capacitor is further provided between the photoelectric conversion element and the FD in each pixel circuit 100. Then, a first switch is provided between the photoelectric conversion element and the capacitor, a second switch is provided between the capacitor and the floating diffusion layer, and opening and closing of each of the first and second switches is controlled by a pulse supplied via the pixel signal line 106.

In such a configuration, during the exposure period, in the pixel circuit 100 included in the frame 200, the first and second switches are opened, and the first switch is changed from the opened state to the closed state at the end of the exposure to transfer the electric charges from the photoelectric conversion element to the capacitor. Thereafter, the capacitor is regarded as the photoelectric conversion element, and the electric charges are read out from the capacitor in the similar sequence as the reading out operation described in the rolling shutter method. Therefore, it is possible to enable the simultaneous exposure in the pixel circuits 100 included in the frame 200.

FIG. 8B schematically illustrates an example of a relationship between imaging and time in the global shutter method. In FIG. 8B, the vertical axis represents a line position, and the horizontal axis represents time. In the global shutter method, since the exposure is simultaneously performed in the pixel circuits 100 included in the frame 200, the timing of the exposure in each line can be the same as illustrated in FIG. 8B. Accordingly, for example, even in a case where a positional relationship between the information processing system 1 and the subject in the horizontal direction is changed at a high speed, distortion according to the change does not occur in a captured image 206 of the frame 200 as illustrated in FIG. 8C.

In the global shutter method, the simultaneity of the timing of the exposure in the pixel circuits 100 included in the frame 200 can be secured. Therefore, by controlling the timing of each pulse supplied by the pixel signal line 106 of each line and the timing of the transfer by each vertical signal line VSL, sampling (reading out of pixel signals) in various patterns can be realized.

Figure 9A:
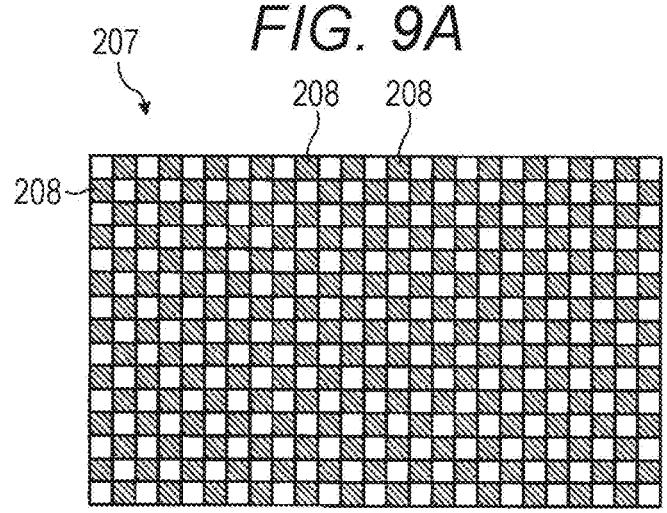
FIG. 9A is a diagram schematically illustrating an example of a pattern of sampling that can be realized in the global shutter method.
Figure 9B:
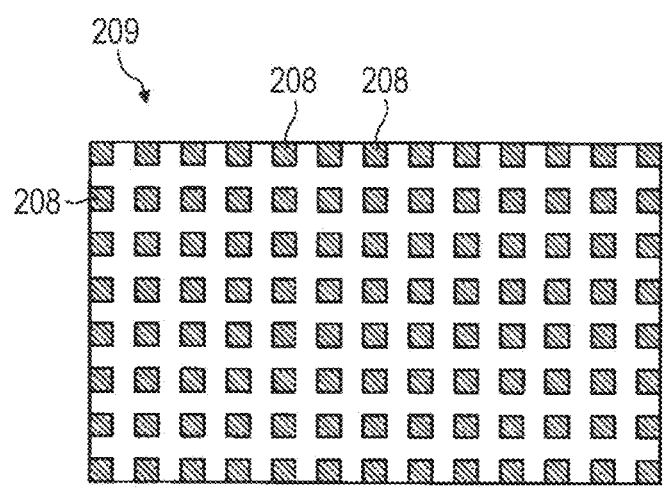
FIG. 9B is a diagram schematically illustrating an example of a pattern of sampling that can be realized in the global shutter method.

FIGS. 9A and 9B are diagrams schematically illustrating an example of the pattern of sampling that can be realized in the global shutter method. FIG. 9A illustrates an example in which samples 208, from which the pixel signals are read out, are extracted in a checkerboard pattern from the pixel circuits 100 that are included in the frame 200 and are arranged in a matrix. Furthermore, FIG. 9B is an example in which samples 208, from which the pixel signals are read out, are extracted in lattice pattern from the pixel circuits 100.

Furthermore, also in the global shutter method, similarly to the rolling shutter method described above, imaging can be sequentially performed line by line.

(2-3. Regarding DNN)

Next, recognition processing using a deep neural network (DNN) applicable to each embodiment will be schematically described. In each embodiment, recognition processing for the image data is performed using a convolutional neural network (CNN) and a recurrent neural network (RNN) among DNNs. Hereinafter, "recognition processing for image data" is appropriately referred to as "image recognition processing" or the like.

(2-3-1. Outline of CNN)

Figure 10:
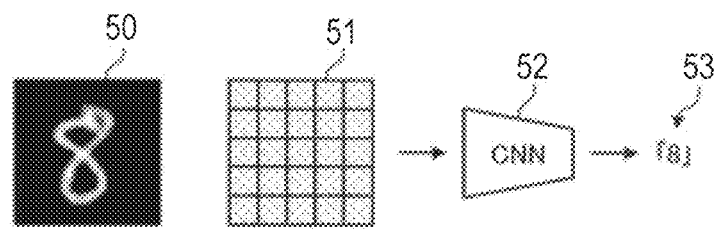
FIG. 10 is a diagram for schematically describing image recognition processing by CNN.

First, the CNN will be schematically described. In general, image recognition processing by the CNN performs image recognition processing on the basis of image information by pixels arranged in a matrix, for example. FIG. 10 is a diagram for schematically describing the image recognition processing by the CNN. Processing by a CNN 52 learned in advance is performed on entire pixel information 51 of an image 50 in which a numeral "8" that is an object as the recognition target is drawn. Therefore, a numeral "8" is recognized as a recognition result 53.

On the other hand, it is also possible to obtain a recognition result from a part of the image as the recognition target by performing processing by the CNN on the basis of the image for each line. FIG. 11 is a diagram for schematically describing the image recognition processing of obtaining the recognition result from a part of the image as the recognition target. In FIG. 11, an image 50' is obtained by partially acquiring the numeral "8", which is the object as the recognition target, in units of lines. For example, pixel information 54a, 54b, and 54c for each line forming pixel information 51' of the image 50' is sequentially processed by CNN 52' learned in advance.

For example, it is assumed that a recognition result 53a obtained by the recognition processing by the CNN 52' on the pixel information 54a of the first line is not an effective recognition result. Here, the effective recognition result refers to, for example, a recognition result in which a score indicating the reliability of the recognized result is a predetermined value or more.

Note that the reliability according to the present embodiment means an evaluation value representing how much a recognition result [T] output by the DNN may be reliable. For example, the range of the reliability is a range of 0.0 to 1.0, and a numerical value closer to 1.0 indicates that there are few other competition candidates having a score similar to the recognition result [T]. On the other hand, a numerical value close to 0 indicates that there are many other contention candidates having a score similar to the recognition result [T].

The internal state of the CNN 52' is subjected to an update 55 on the basis of the recognition result 53a. Next, the recognition processing is performed on the pixel information 54b of the second line by the CNN 52' of which the internal state is subjected to the update 55 by the previous recognition result 53a. In FIG. 11, as a result, a recognition result 53b indicating that the numeral as the recognition target is either "8" or "9" is obtained. Moreover, the update 55 of the internal information of the CNN 52' is performed on the basis of the recognition result 53b. Next, the recognition processing is performed on the pixel information 54c of the third line by the CNN 52' of which the internal state is subjected to the update 55 by the previous recognition result 53b. In FIG. 11, as a result, the numeral as the recognition target is narrowed down to "8" out of "8" or "9".

Here, in the recognition processing illustrated in FIG. 11, the internal state of the CNN is updated using the result of the previous recognition processing, and the recognition processing is performed using the pixel information of the line, which is adjacent to the line on which the previous recognition processing has been performed, by the CNN of which the internal state has been updated. That is, the recognition processing illustrated in FIG. 11 is sequentially executed line by line on the image while updating the internal state of the CNN on the basis of the previous recognition result. Accordingly, the recognition processing illustrated in FIG. 11 is processing recursively and sequentially executed line by line, and can be considered to have a structure corresponding to the RNN.

(2-3-2. Outline of RNN)

Figure 12B:
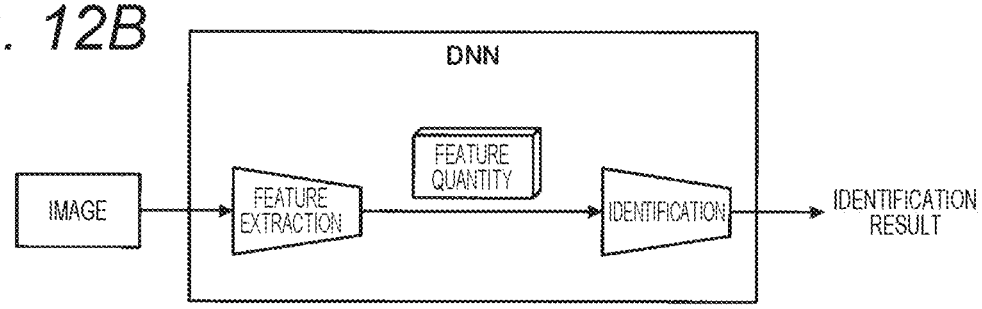
FIG. 12B is a diagram schematically illustrating an example of identification processing by DNN in a case where time-series information is not used.

Next, the RNN will be schematically described. FIGS. 12A and 12B are diagrams schematically illustrating an example of the identification processing (recognition processing) by the DNN in a case where time-series information is not used. In this case, as illustrated in FIG. 12A, one image is input to the DNN. In the DNN, the identification processing is performed on the input image, and an identification result is output.

FIG. 12B is a diagram for describing the processing of FIG. 12A in more detail. As illustrated in FIG. 12B, the DNN executes feature extraction processing and identification processing. In the DNN, a feature quantity is extracted from the input image by the feature extraction processing. Furthermore, in the DNN, the identification processing is executed on the extracted feature quantity to obtain an identification result.

Figure 13A:
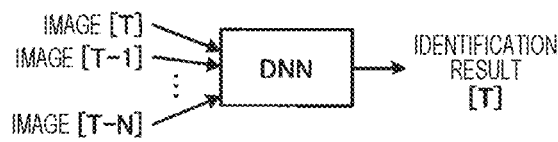
FIG. 13A is a diagram schematically illustrating a first example of identification processing by DNN in a case where time-series information is used.
Figure 13B:
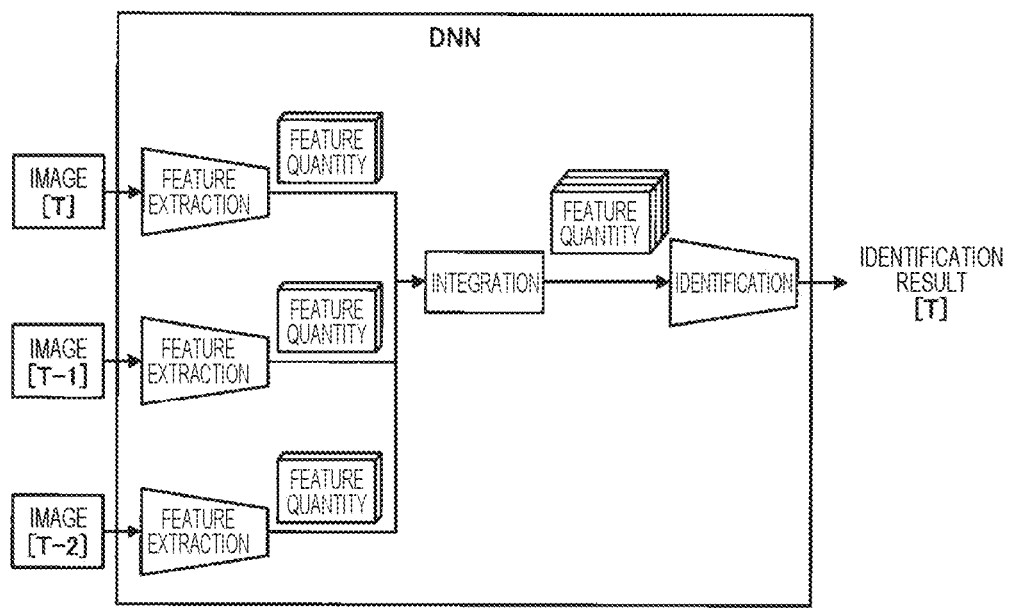
FIG. 13B is a diagram schematically illustrating a first example of identification processing by DNN in a case where time-series information is used.

FIGS. 13A and 13B are diagrams schematically illustrating a first example of the identification processing by the DNN in a case where time-series information is used. In the example of FIGS. 13A and 13B, the identification processing by the DNN is performed using a fixed number of pieces of past information on time series. In the example of FIG. 13A, an image [T] for time T, an image [T−1] for time T−1 before time T, and an image [T−2] for time T−2 before time T−1 are input to the DNN. In the DNN, the identification processing is executed on each of the input images [T], [T−1], and [T−2] to obtain an identification result [T] for time T. The reliability is assigned to the identification result [T].

FIG. 13B is a diagram for describing the processing of FIG. 13A in more detail. As illustrated in FIG. 13B, in the DNN, the feature extraction processing described above with reference to FIG. 12B is executed on a one-to-one basis for each of the input images [T], [T−1], and [T−2], and feature quantities respectively corresponding to the images [T], [T−1], and [T−2] are extracted. In the DNN, the respective feature quantities obtained on the basis of the images [T], [T−1], and [T−2] are integrated, and the identification processing is executed on the integrated feature quantity to obtain the identification result [T] for time T. The reliability is assigned to the identification result [T].

In the method of FIGS. 13A and 13B, a plurality of configurations for extracting the feature quantity is required, a configuration for extracting the feature quantity is required according to the number of past images that can be used, and there is a concern that the configuration of the DNN becomes large.

Figure 14A:
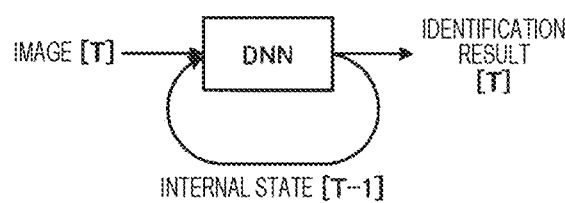
FIG. 14A is a diagram schematically illustrating a second example of identification processing by DNN in a case where time-series information is used.
Figure 14B:
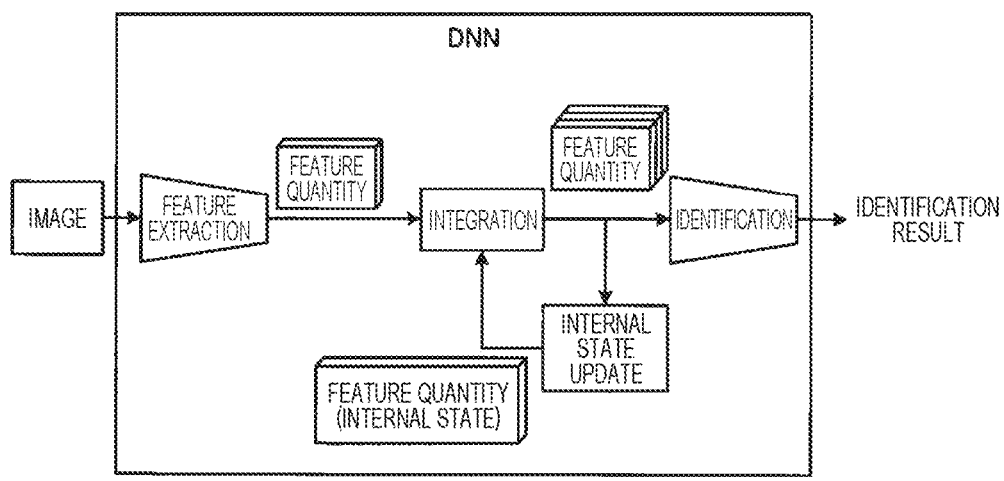
FIG. 14B is a diagram schematically illustrating a second example of identification processing by DNN in a case where time-series information is used.

FIGS. 14A and 14B are diagrams schematically illustrating a second example of the identification processing by the DNN in a case where time-series information is used. In the example of FIG. 14A, the image [T] for time T is input to the DNN of which the internal state has been updated to the state for time T−1, and the identification result [T] for time T is obtained. The reliability is assigned to the identification result [T].

FIG. 14B is a diagram for describing the processing of FIG. 14A in more detail. As illustrated in FIG. 14B, in the DNN, the feature extraction processing described above with reference to FIG. 12B is executed on the input image [T] for time T, and feature quantity corresponding to the image [T] is extracted. In the DNN, the internal state is updated by the image before time T, and the feature quantity relating to the updated internal state is stored. The feature quantity relating to the stored internal information and the feature quantity in the image [T] are integrated, and the identification processing is executed on the integrated feature quantity.

The identification processing illustrated in FIGS. 14A and 14B is executed using, for example, the DNN of which the internal state has been updated using the previous identification result, and is recursive processing. The DNN that performs recursive processing in this manner is referred to as a recurrent neural network (RNN). The identification processing by the RNN is generally used for moving image recognition or the like, and for example, the internal state of the DNN is sequentially updated by frame images updated in time series, so that the identification accuracy can be improved.

In the present disclosure, the RNN is applied to a structure of the rolling shutter method. That is, in the rolling shutter method, the reading out of pixel signals is sequentially performed line by line. Therefore, the pixel signals that are sequentially read line by line are applied to the RNN as the information on time series. Therefore, the identification processing based on the plurality of lines can be executed with a small-scale configuration as compared with the case of using the CNN (refer to FIG. 13B). The present disclosure is not limited thereto, and the RNN can be applied to a structure of the global shutter method. In this case, for example, it is conceivable to regard adjacent lines as the information on time series.

(2-4. Regarding Driving Speed)

Figure 15A:
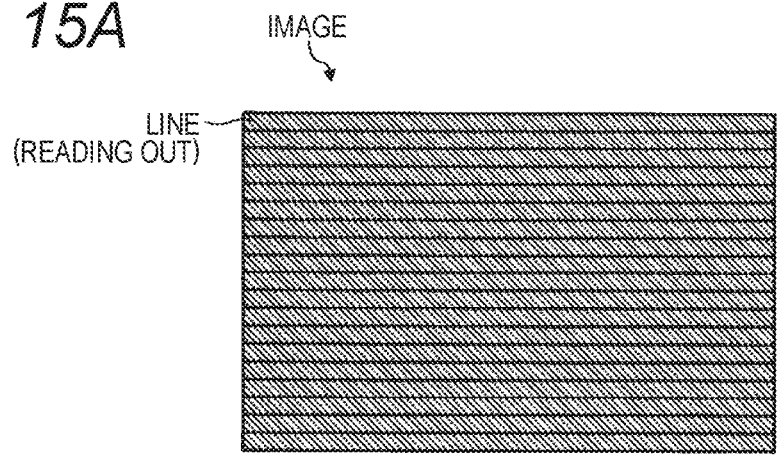
FIG. 15A is a diagram for describing a relationship between a driving speed of a frame and a readout amount of a pixel signal.
Figure 15B:
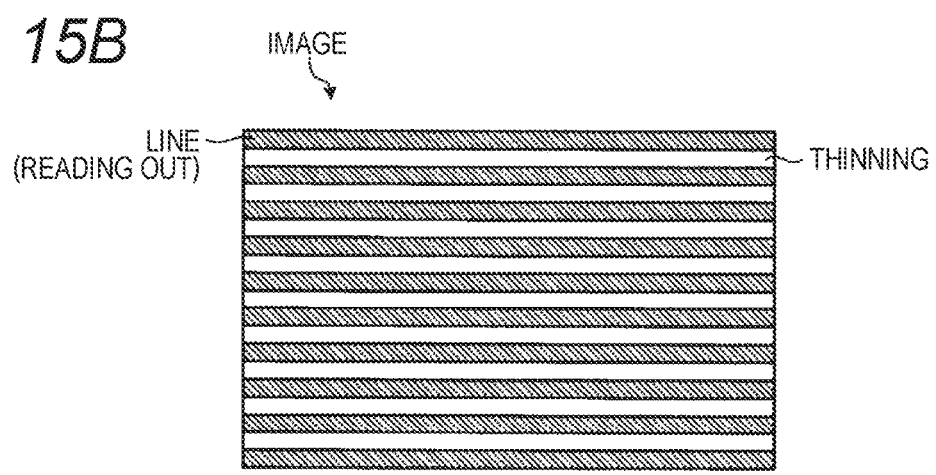
FIG. 15B is a diagram for describing a relationship between a driving speed of a frame and a readout amount of a pixel signal.

Next, a relationship between the driving speed of the frame and the readout amount of the pixel signal will be described using FIGS. 15A and 15B. FIG. 15A is a diagram illustrating an example of reading out all lines in an image. Here, it is assumed that the resolution of the image as a target for the recognition processing is horizontal 640 pixels×vertical 480 pixels (480 lines). In this case, driving at a driving speed of 14400 [line/second] enables an output at 30 [frame per second (fps)].

Next, it is considered that imaging is performed by thinning out lines. For example, as illustrated in FIG. 15B, it is assumed that imaging is performed by ½ thinning reading in which imaging is performed by skipping one line at a time. As a first example of ½ thinning, in a case of driving at a driving speed of 14400 [lines/second] in the similar manner as described above, the number of lines to be read out from the image is ½. Therefore, although the resolution is decreased, it is possible to perform an output at 60 [fps] which is twice the speed in a case where thinning is not performed, and the frame rate can be improved. As a second example of ½ thinning, in a case of driving at a driving speed of 7200 [fps], which is a half of that in the first example, the frame rate is 30 [fps] similar to a case where no thinning is performed, but power saving can be achieved.

Whether not to perform thinning, whether to increase the driving speed by performing thinning, or whether to perform thinning and adjust the driving speed at the time of reading out the lines of the image can be selected according to, for example, the purpose of the recognition processing based on the read pixel signal.

Figure 16:
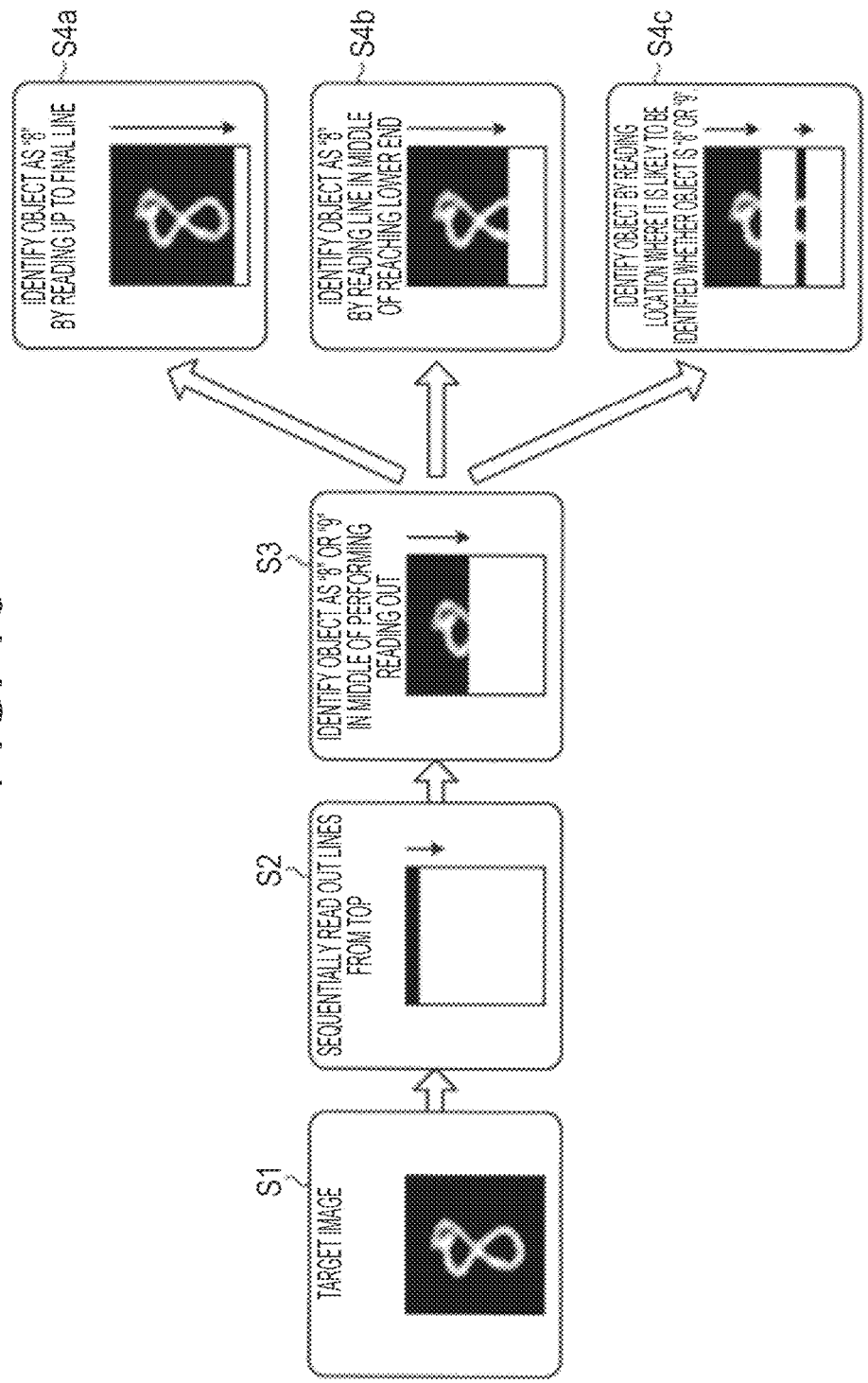
FIG. 16 is a schematic diagram for schematically describing recognition processing according to each embodiment of the present disclosure.

FIG. 16 is a schematic diagram for schematically describing the recognition processing according to the present embodiment of the present disclosure. In FIG. 16, in step S1, the information processing system 1 (refer to FIG. 1) according to the present embodiment starts capturing a target image as the recognition target.

Note that the target image is, for example, an image in which the numeral "8" is drawn by handwriting. Furthermore, it is assumed that a learning model learned to be able to identify a numeral by predetermined teacher data is stored as a program in the memory 13 in advance, and the recognition processing unit 12 can identify the numeral included in the image by reading out and executing the program from the memory 13. Moreover, it is assumed that the information processing system 1 performs imaging by the rolling shutter method. Note that, even in a case where the information processing system 1 performs imaging by the global shutter method, the following processing can be applied similarly to the case of the rolling shutter method.

In a case where imaging is started, the information processing system 1 sequentially reads out the frames from the upper end side toward the lower end side of the frames in units of lines in step S2.

In a case where the lines are read out to a certain position, the recognition processing unit 12 identifies the numeral "8" or "9" from the image of the read lines (step S3). For example, since the numerals "8" and "9" include a feature portion common to the upper half portion, the recognized object can be identified as either the numeral "8" or "9" when the feature portion is recognized by sequentially reading out the lines from the top.

Here, as illustrated in step S4a, the whole aspect of the object recognized by reading out the lines up to the line of the lower end or the line near the lower end of the frame appears, and it is confirmed that the object identified as either the numeral "8" or "9" in step S2 is the numeral "8".

On the other hand, steps S4b and S4c are processing relating to the present disclosure.

As illustrated in step S4b, the line is further read out from the line position where the reading out has been performed in step S3, and it is possible to identify that the recognized object is the numeral "8" even in the middle of reaching the lower end of the numeral "8". For example, the lower half of the numeral "8" and the lower half of the numeral "9" have different features. By reading out the line up to the portion where the difference in the features becomes clear, it is possible to identify whether the object recognized in step S3 is a numeral "8" or "9". In the example of FIG. 16, it is confirmed in step S4b that the object is the numeral "8".

Furthermore, as illustrated in step S4c, it is also conceivable that the reading out is further performed in the state of step S3 from the line position in step S3 and the object identified in step S3 to jump to a line position at which it is likely to be identified whether the object identified in step S3 is a numeral "8" or "9". By reading out the line at the jump destination, it is possible to confirm whether the object identified in step S3 is a numeral "8" or "9". Note that the line position at the jump destination can be determined on the basis of the learning model learned in advance on the basis of predetermined teacher data.

Here, in a case where the object is confirmed in step S4b or step S4c described above, the information processing system 1 can end the recognition processing. Therefore, it is possible to realize shortening of recognition processing and power saving in the information processing system 1.

Note that the teacher data is data that holds a plurality of combinations of input signals and output signals for each readout unit. As an example, in a task of identifying a numeral described above, data (line data, subsampled data, or the like) for each readout unit can be applied as the input signal, and data indicating a "ground-truth numeral" can be applied as the output signal. As another example, in a task of detecting an object, for example, data (line data, subsampled data, or the like) for each readout unit can be applied as the input signal, and an object class (human body/vehicle/non-object), coordinates (x, y, h, w) of the object, and the like can be applied as the output signal. Furthermore, the output signal may be generated only from the input signal using self-supervised learning.

First Embodiment

Figure 17:
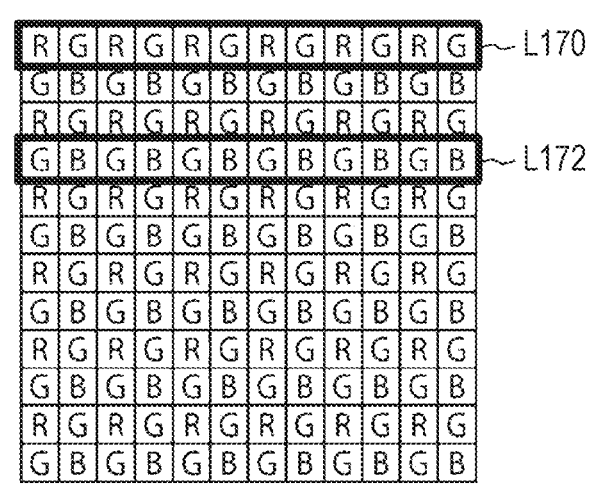

FIG. 17 is a diagram illustrating a problem in the recognition processing in a case where color filters are arranged in a Bayer array in the pixels of the sensor unit 10. Here, a case where the line data is read out will be described. In a case where line data L170 is read out, image data is mainly the R pixel (pixel having a red filter) and the G pixel (pixel having a green filter). Furthermore, in a case where line data L172 is read out, image data is mainly the G pixel and the B pixel (pixel having a blue filter). In this manner, color information that can be acquired differs depending on lines.

For this reason, in the case of skip reading or random reading, there is a possibility that color information cannot be stably acquired, and there is a concern that the accuracy is decreased in a recognition task that requires color.

Figure 18:
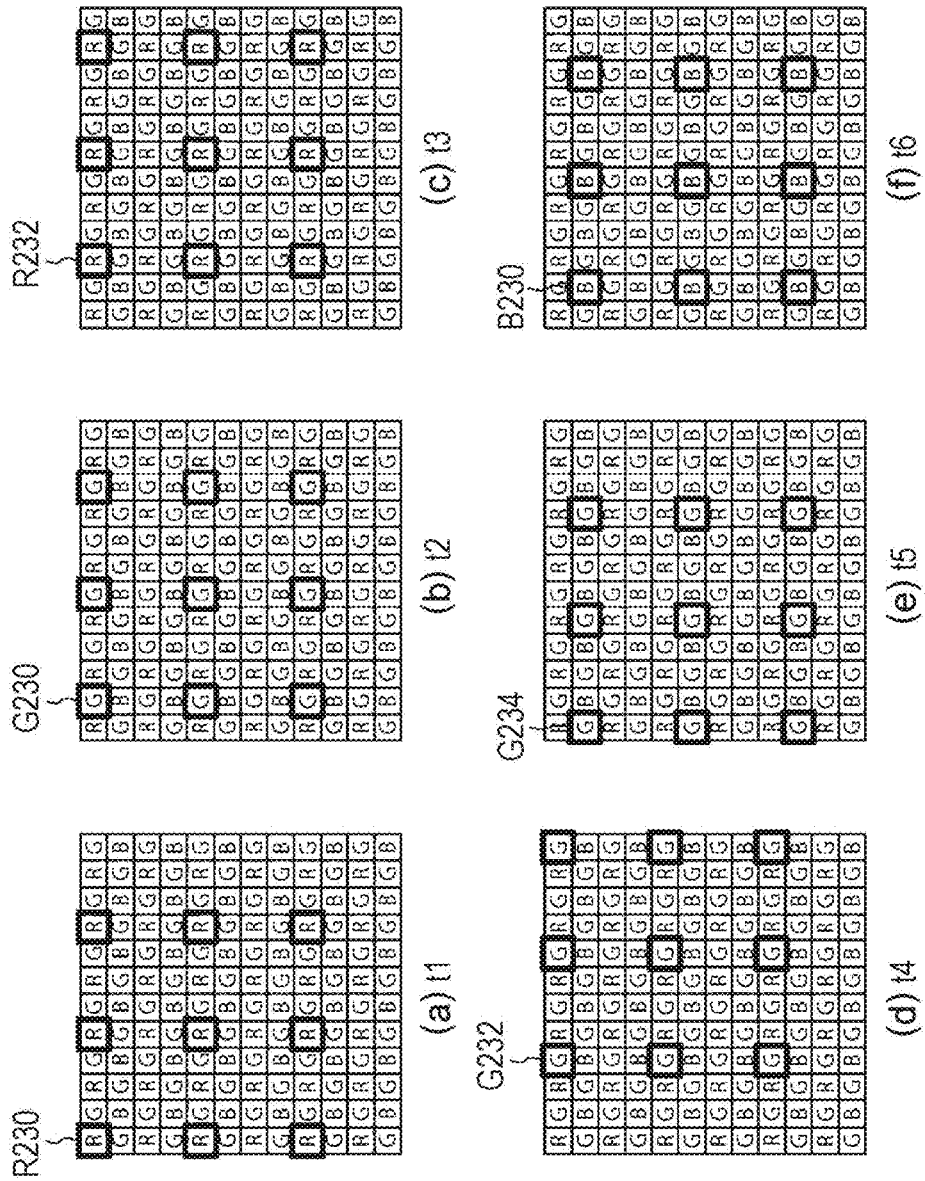
FIG. 18 is a diagram illustrating a problem in recognition processing by subsampling.

FIG. 18 is a diagram illustrating a problem in the recognition processing by subsampling in a case where color filters are arranged in a Bayer array. (a) to (d) indicate subsampling positions R230, G230, R232, G232, G234, and B230 of the image data corresponding to times t1 to t6, respectively. As illustrated in these drawings, in the case of sampling and reading in units of one pixel, color information that can be acquired differs depending on lines. For this reason, in the case of skip reading or random reading, there is a possibility that color information cannot be stably acquired. Therefore, there is a concern that the accuracy is decreased in a recognition task that requires color. Note that, as the sampling period can be largely adjusted, it is possible to achieve the high speed driving and low power consumption of the sensor unit 10. On the other hand, in a case where the periodic pattern of the sampling is complicated, the circuit scale of the sensor unit 10 is increased, or the difficulty degree of design is increased.

Figure 19:
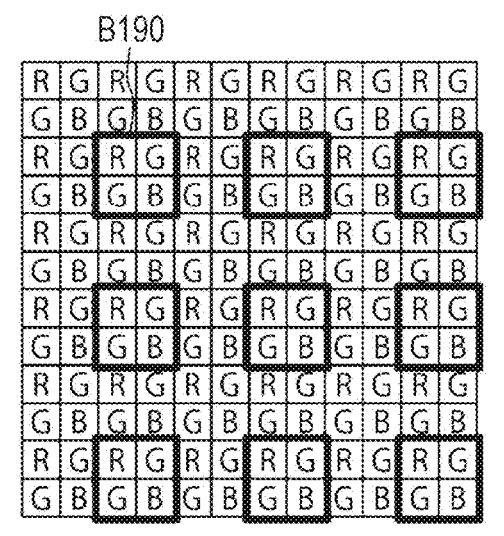

FIG. 19 is a diagram schematically illustrating a case where sampling and reading are performed in units of blocks. As illustrated in FIG. 19, all types of color information can be acquired by sampling and reading in units of blocks B190. On the other hand, depending on which periodic pattern can be supported, the circuit scale of the sensor unit 10 is increased, or the difficulty degree of design is increased.

Figure 20:
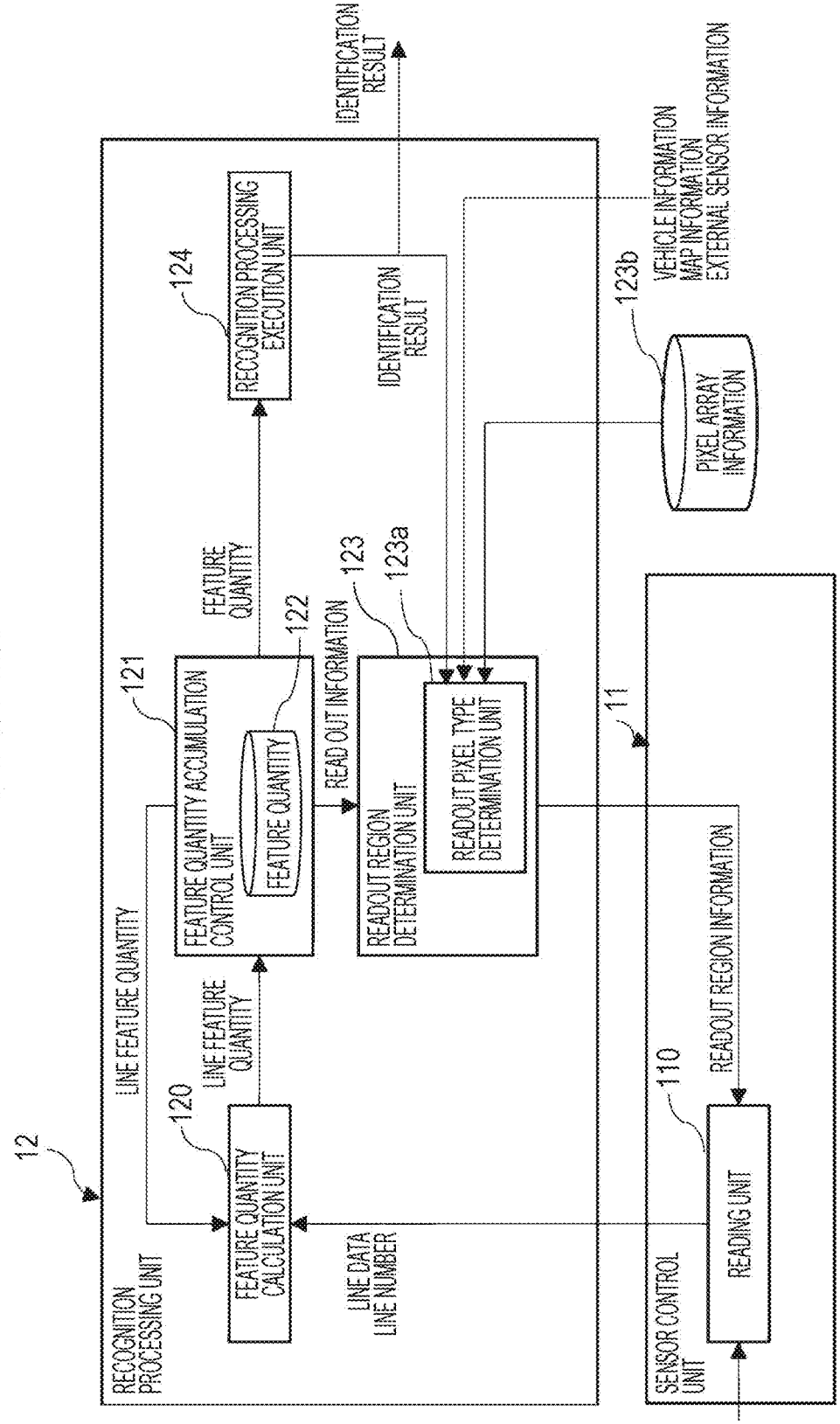
FIG. 20 is a functional block diagram of an example for describing functions of a sensor control unit and a recognition processing unit.

FIG. 20 is a functional block diagram of an example for describing functions of the sensor control unit 11 and the recognition processing unit 12 according to the present embodiment.

In FIG. 20, the sensor control unit 11 includes a reading unit 110. FIG. 20 further illustrates an accumulation unit 123b that stores pixel array information of the pixel array unit 101. The pixel array information includes information on filters arranged in the pixels constituting the sensor unit 10. For example, the pixel array information includes information on the filter type such as a red filter (R), a green filter (G), a blue filter (B), a white filter (W), a spectral filter type, and an infrared filter. Furthermore, the pixel array information also includes information on a so-called special pixel such as a polarization direction in a case where a polarizing filter is provided.

The recognition processing unit 12 includes a feature quantity calculation unit 120, a feature quantity accumulation control unit 121, a readout region determination unit 123, and a recognition processing execution unit 124. The readout region determination unit 123 further includes a readout pixel type determination unit 123a.

In the sensor control unit 11, the reading unit 110 reads out the image data from the pixel array unit 101 on the basis of the readout region information. The readout region information is supplied from the recognition processing unit 12. The readout region information is information indicating a readout region to be read out from the sensor unit 10. That is, the readout region information is, for example, a line number of one or a plurality of lines. The present disclosure is not limited thereto, and the readout region information may be information indicating a pixel position in one line. Furthermore, by combining one or more line numbers and information indicating pixel positions of one or more pixels in the line as the readout region information, it is possible to designate the readout regions of various patterns. Note that the readout region is equivalent to the readout unit. The present disclosure is not limited thereto, and the readout region and the readout unit may be different from each other.

Furthermore, the reading unit 110 can receive information indicating exposure and analog gain from the recognition processing unit 12 or the visual recognition processing unit 14 (refer to FIG. 1). The reading unit 110 reads out the pixel data from the sensor unit 10 according to the readout region information input from the readout region determination unit 123. For example, the reading unit 110 obtains the line number indicating the line to be read out and the pixel position information indicating the position of the pixel to be read out in the corresponding line on the basis of the readout region information, and outputs the obtained line number and pixel position information to the sensor unit 10.

Furthermore, the reading unit 110 sets the exposure and the analog gain (AG) for the sensor unit 10 according to the supplied information indicating the exposure and the analog gain. Moreover, the reading unit 110 can generate the vertical synchronization signal and the horizontal synchronization signal, and supply the signals to the sensor unit 10.

In the recognition processing unit 12, the readout pixel type determination unit 123a receives readout information indicating the readout region to be read out next, from the feature quantity accumulation control unit 121. The pixel type determination unit 123a generates the readout region information on the basis of the received readout information on the basis of the information on the pixel array, and outputs the readout region information to the reading unit 110. The pixel type determination unit 123a changes the pixel type according to vehicle information, map information, and external sensor information. For example, since the G pixel in which the G filter is arranged has high sensitivity and little noise, the G pixel is preferentially selected in normal recognition processing. On the other hand, in a case where the color information is increased in the scenery, or the like, the R, G, and B pixels are selected. In the present embodiment, the pixel in which the red filter (R) is arranged may be referred to as the R pixel, the pixel in which the green filter (G) is arranged may be referred to as the G pixel, the pixel in which the blue filter (B) is arranged may be referred to as the B pixel, the pixel in which the white filter (W) is arranged may be referred to as the W pixel, the pixel in which the polarizing filter is arranged may be referred to as the polarizing pixel, the pixel in which the spectral filter is arranged may be referred to as the spectral pixel, and the pixel in which the infrared filter is arranged may be referred to as the infrared pixel.

Here, the readout pixel type determination unit 123a can use, as the readout region indicated in the readout region information, for example, information in which readout position information for reading out the pixel data of a predetermined readout unit is added to the predetermined readout unit. The readout unit is a set of one or more pixels, and is a unit of processing by the recognition processing unit 12 and the visual recognition processing unit 14. As an example, in a case where the readout unit is a line, a line number [L #x] indicating the position of the line is added as the readout position information. Furthermore, in a case where the readout unit is a rectangular region including a plurality of pixels, information indicating the position of the rectangular region in the pixel array unit 101, for example, information indicating the position of the pixel at the upper left corner is added as the readout position information. In the pixel type determination unit 123a, the readout unit to be applied is specified in advance. Furthermore, in a case where the readout pixel type determination unit 123a reads out the subpixel in the global shutter method, the position information of the subpixel can be included in the readout region. The present disclosure is not limited thereto, and the pixel type determination unit 123a can determine the readout unit according to, for example, an instruction from the outside of the readout region determination unit 123. Accordingly, the readout region determination unit 123 functions as a readout unit control unit that controls the readout unit.

Note that the readout region determination unit 123 can also determine the readout region to be read out next on the basis of recognition information supplied from the recognition processing execution unit 124 as described later, and generate the readout region information indicating the determined readout region.

In the recognition processing unit 12, the feature quantity calculation unit 120 calculates the feature quantity in the region indicated by the readout region information on the basis of the pixel data and the readout region information supplied from the reading unit 110. The feature quantity calculation unit 120 outputs the calculated feature quantity to the feature quantity accumulation control unit 121.

The feature quantity calculation unit 120 may calculate the feature quantity on the basis of the pixel data supplied from the reading unit 110 and the past feature quantity supplied from the feature quantity accumulation control unit 121. The present disclosure is not limited thereto, and the feature quantity calculation unit 120 may acquire information for setting the exposure and the analog gain from the reading unit 110, for example, and calculate the feature quantity by further using the acquired information.

In the recognition processing unit 12, the feature quantity accumulation control unit 121 accumulates the feature quantity supplied from the feature quantity calculation unit 120 in a feature quantity accumulation unit 122. Furthermore, in a case where the feature quantity is supplied from the feature quantity calculation unit 120, the feature quantity accumulation control unit 121 generates the readout information indicating the readout region to be read out next, and outputs the readout information to the readout region determination unit 123.

Here, the feature quantity accumulation control unit 121 can integrate and accumulate the already accumulated feature quantity and the newly supplied feature quantity. Furthermore, the feature quantity accumulation control unit 121 can delete the feature quantity that has become unnecessary, among the feature quantities accumulated in the feature quantity accumulation unit 122. The feature quantity that has become unnecessary may be, for example, a feature quantity relating to a previous frame, a feature quantity that is already accumulated by being calculated on the basis of a frame image of a scene different from a frame image for which a new feature quantity has been calculated, or the like. Furthermore, the feature quantity accumulation control unit 121 can also delete and initialize all the feature quantities accumulated in the feature quantity accumulation unit 122 as necessary.

Furthermore, the feature quantity accumulation control unit 121 generates a feature quantity for the recognition processing execution unit 124 to use in the recognition processing, on the basis of the feature quantity supplied from the feature quantity calculation unit 120 and the feature quantity accumulated in the feature quantity accumulation unit 122. The feature quantity accumulation control unit 121 outputs the generated feature quantity to the recognition processing execution unit 124.

The recognition processing execution unit 124 executes the recognition processing on the basis of the feature quantity supplied from the feature quantity accumulation control unit 121. The recognition processing execution unit 124 performs object detection, face detection, and the like by the recognition processing. The recognition processing execution unit 124 outputs the recognition result obtained by the recognition processing to the output control unit 15 and a reliability calculation unit 125. The recognition result includes information on the detection score.

The recognition processing execution unit 124 can also output the recognition information including the recognition result generated by the recognition processing to the readout region determination unit 123. Note that the recognition processing execution unit 124 can receive the feature quantity from the feature quantity accumulation control unit 121 and execute the recognition processing on the basis of, for example, a trigger generated by a trigger generation unit (not illustrated).

Figures 21, 22, 23:
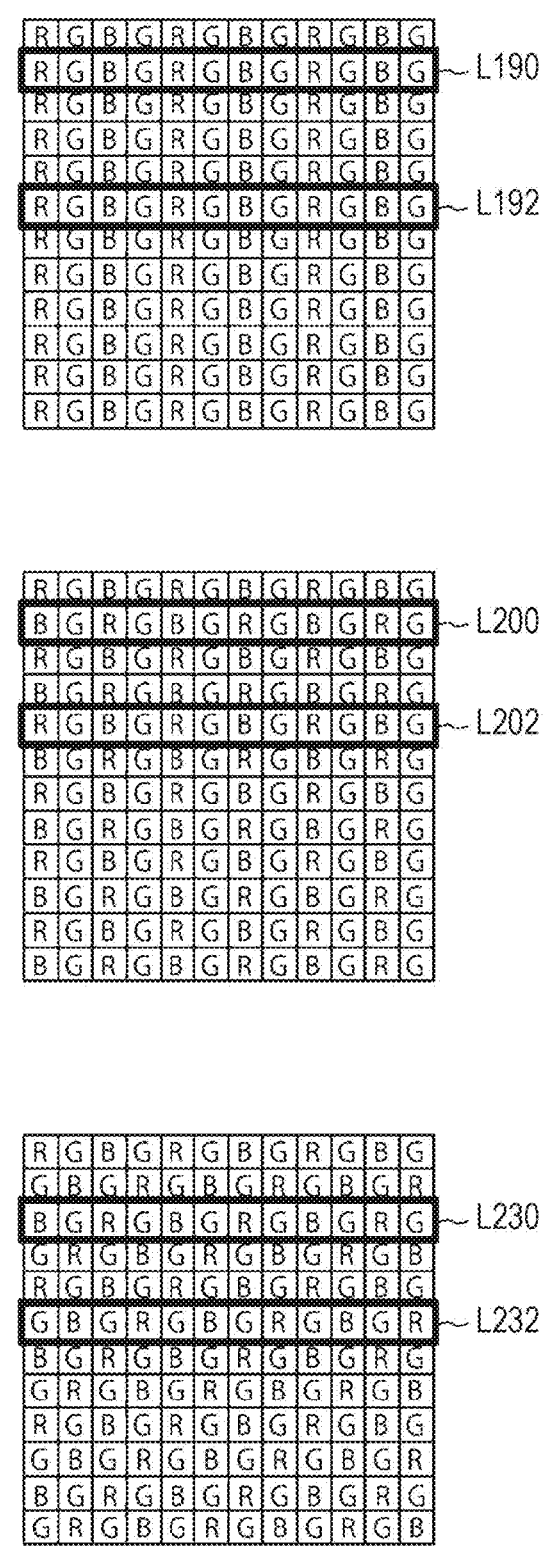

FIG. 21 is a diagram illustrating an example of the pixel array unit 101 in which R, G, and B pixels are arranged in a line in the direction orthogonal to the readout direction of the line data. As illustrated in FIG. 21, even in a case where data is read out in any line such as the line data L190 or L192, all types of color information can be acquired. Therefore, in the recognition processing using the line data, since the color information can be stably acquired, it is possible to suppress a decrease in accuracy of the recognition task that requires color.

FIG. 22 is a diagram illustrating an example in which G pixels are arranged in every other column in the direction orthogonal to the readout direction of the line data and columns in which R and B pixels are alternately arranged are arranged between the columns in which the G pixels are arranged. As illustrated in FIG. 22, in the columns in which the R and B pixels are alternately arranged, the arrangement order of the R and B pixels is different for each column. Even in a case where data is read out in any line such as the line data L200 or L202, all types of color information can be acquired. Therefore, in the recognition processing using the line data, since the color information can be stably acquired, it is possible to suppress a decrease in accuracy of the recognition task that requires color. Furthermore, with such an arrangement, it is also possible to improve the spatial frequencies of the R and B pixels in the column direction as compared with the example of FIG. 21.

FIG. 23 is a diagram illustrating an example in which R, B, and G pixels are alternately arranged in the columns in the direction orthogonal to the readout direction of the line data and the arrangement order of R, B, and G pixels is different for each column. Even in a case where data is read out in any line such as the line data L230 or L232, all types of color information can be acquired. Therefore, in the recognition processing using the line data, since the color information can be stably acquired, it is possible to suppress a decrease in accuracy of the recognition task that requires color. Furthermore, with such an arrangement, it is possible to increase the spatial frequency of the G pixel in the column direction and decrease the spatial frequency of the G pixel in the row direction, as compared with the example of FIG. 21. Furthermore, it is possible to increase the spatial frequency in the column direction of the R and B pixels, and decrease the spatial frequency in the row direction thereof.

Figures 24, 25:
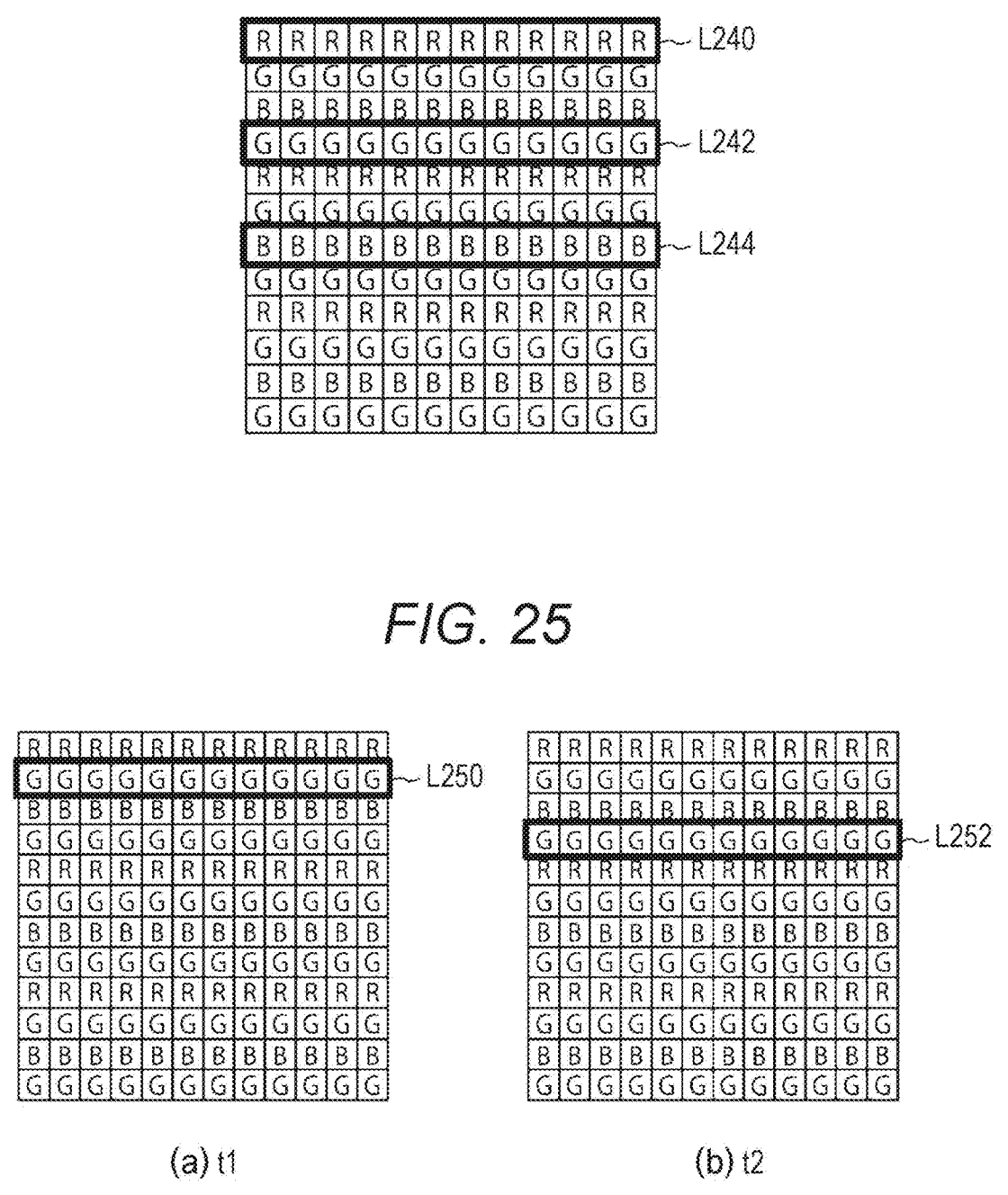

FIG. 24 is a diagram illustrating an example in which R, B, and G pixels are alternately arranged in a column in the readout direction of the line data. Even in a case where data is read out in any line such as the line data L240, L242, or L244, single color information can be acquired.

FIG. 25 is a diagram illustrating another readout method in FIG. 24. (a) of FIG. 25 illustrates a readout range L250 at time t1, and (b) of FIG. 25 illustrates a readout range L252 at time t2. As described above, for example, with such an arrangement, it is possible to perform the reading with priority given to the G pixel. The readout method of continuously reading the G pixel or the like can be applied to the pixel type determination unit 123a until recognition using colors is required. Since the G pixel has high sensitivity and little noise, the recognition rate is improved.

Figures 26, 27:
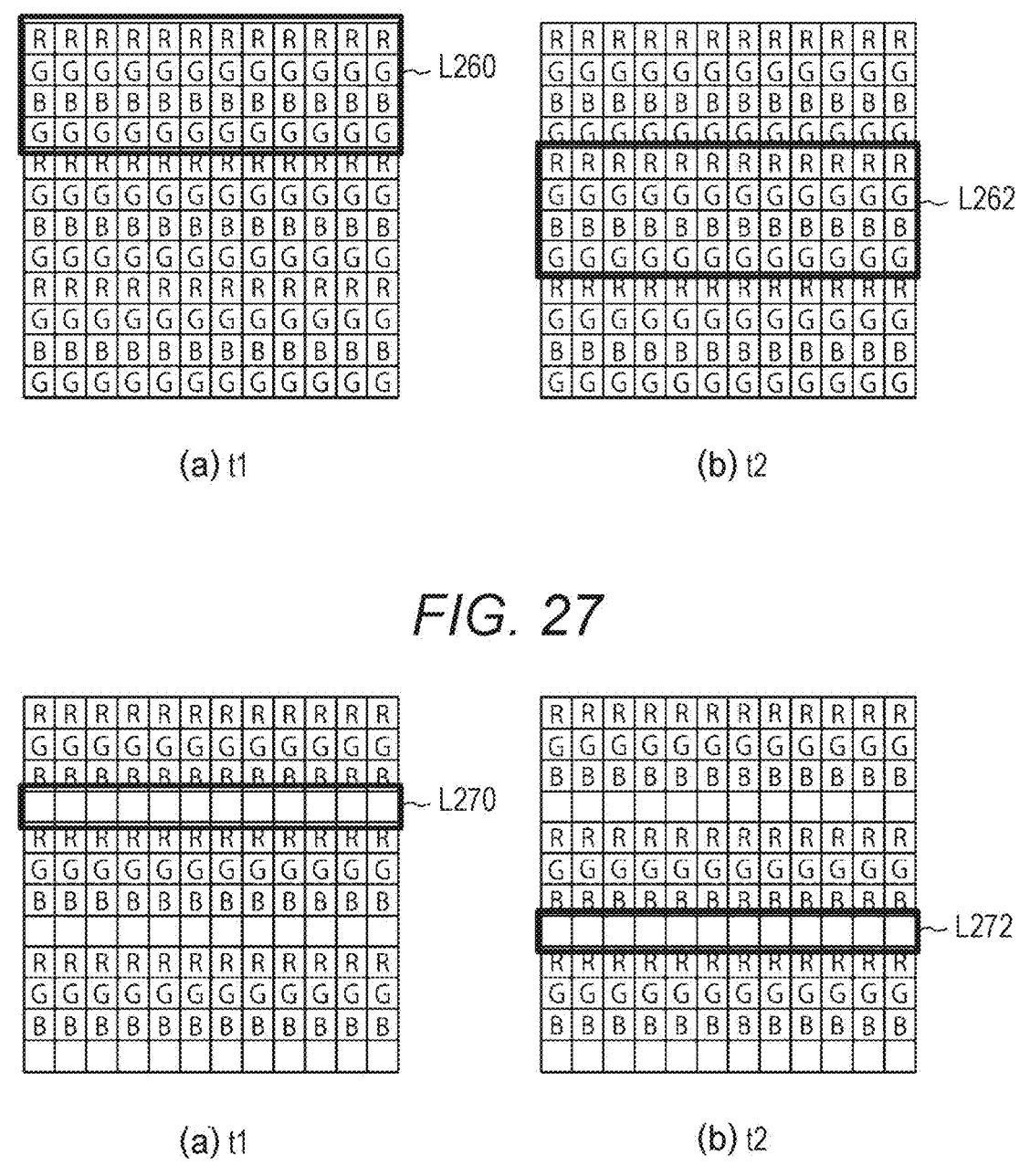

FIG. 26 is a diagram illustrating an example of a case where a plurality of rows is simultaneously read out in FIG. 24. (a) of FIG. 26 illustrates a readout range L260 at time t1, and (b) of FIG. 26 illustrates a readout range L262 at time t2. As described above, in a case where stable recognition is desired, the pixel type determination unit 123a can set the readout region in which reading is performed in units of several lines instead of in units of lines.

FIG. 27 is a diagram illustrating an example in which R, B, G, and W pixels are alternately arranged in a column in the readout direction of the line data. (a) of FIG. 27 illustrates a readout range L270 at time t1, and (b) of FIG. 27 illustrates a readout range L272 at time t2. In this manner, the pixel type determination unit 123a can also set reading with priority given to the W pixel. Since the W pixel has high sensitivity and little noise, it is possible to improve the recognition rate by the readout method of continuously reading the W pixel or the like until recognition using colors is required.

Figures 28, 29:
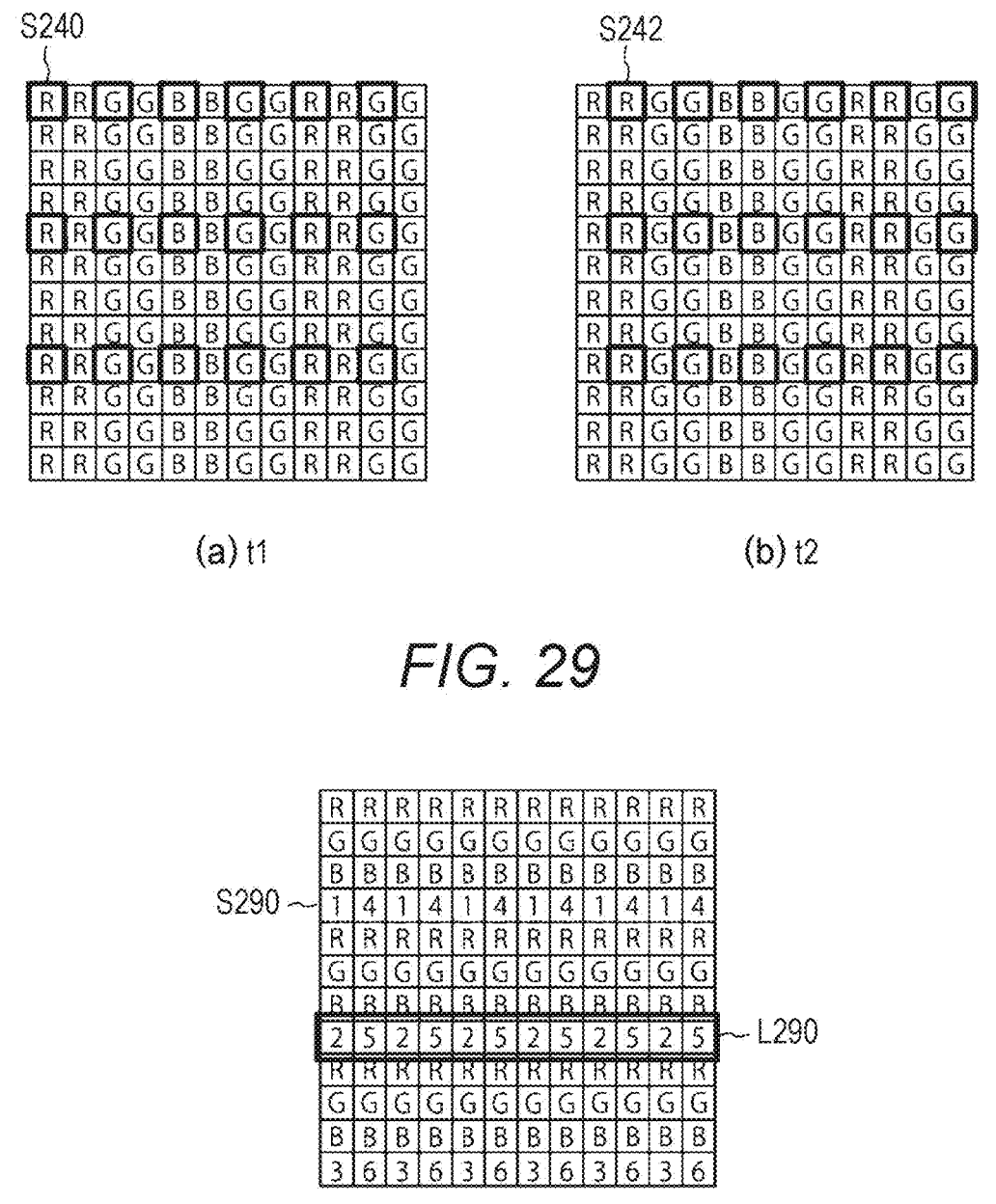

FIG. 28 is a diagram illustrating an example in which R, B, and G pixels are alternately arranged in every two columns in the direction orthogonal to the readout direction of the line data. (a) of FIG. 28 illustrates a subsampling position S240 at time t1, and (b) of FIG. 28 illustrates a subsampling position S242 at time t2. In this manner, all types of color information can be acquired with data of any period timing. Therefore, since the color information can be stably acquired, it is possible to suppress a decrease in accuracy of the recognition task that requires color.

FIG. 29 is a diagram illustrating an example in which R, B, G, and spectral pixels are alternately arranged in a column in the readout direction of the line data. A line S290 indicates a row in which the spectral pixels are arranged. The numerical value in the line S290 is a numeral according to the spectral characteristic. For example, an example is illustrated in which the peak of the transmission wavelength in a wavelength range of 400 to 720 nanometers is shifted to the longer wavelength side as the peak of the transmission wavelength is increased to 1 to 6. That is, the peak of the transmission wavelength of the spectral filter corresponding to the spectral pixel indicated by 1 is the shortest wavelength, and is on the 400 nanometer side. On the other hand, the peak of the transmission wavelength of the spectral filter corresponding to the spectral pixel indicated by 6 is the longest wavelength, and is on the side of the wavelength of 720 nanometers.

The pixel type determination unit 123a normally reads out the visible-light pixels R, B, and G, but can change the priority to read a line L290 of the spectral image (line S290) in a case where it is desired to identify the material of the object. For example, in a situation of emergency stop or avoidance, in a case where a person or a poster cannot be identified, the recognition rate can be improved by performing the identification using spectral information.

Figure 30:
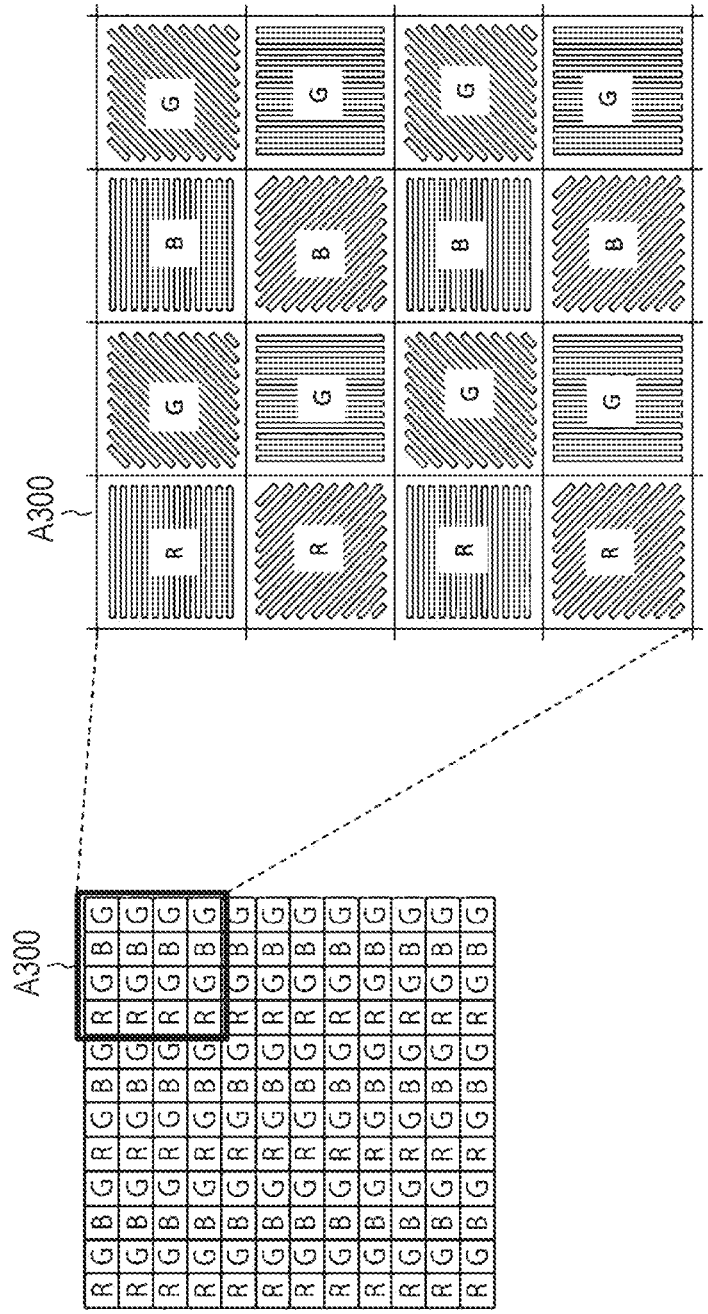
FIG. 30 is a diagram illustrating an example in which polarizing filters are further arranged in a superimposed manner on an arrangement example of FIG. 21.

FIG. 30 is a diagram illustrating an example in which polarizing filters are further arranged in a superimposed manner on the arrangement example of FIG. 21. An arrangement example of the polarizing pixels in an area A300 is illustrated on the right in FIG. 30. In this manner, for example, a deflection filter may be arranged in 16 pixels out of 64 pixels. This example is an example, and the arrangement example of the deflection filter is not limited thereto. For example, the deflection filters may be arranged in a distributed manner. For example, the number of pixels of the pixel array unit 101 is, for example, 1260×1260, and 64 pixels are periodically arranged in the 1260×1260 pixel arrangement.

The pixel type determination unit 123a normally reads out the visible-light pixels R, B, and G, but changes the priority to read a polarized image (area A300) in a case where it is desired to remove reflection and perform recognition. For example, in a case where the direction of the face of a driver of an oncoming vehicle that cannot be observed due to reflection by the windshield is recognized, the priority is changed so as to read the polarized image (area A300). Therefore, it is possible to suppress the reflection components and to suppress a decrease in the recognition rate.

Figure 31:
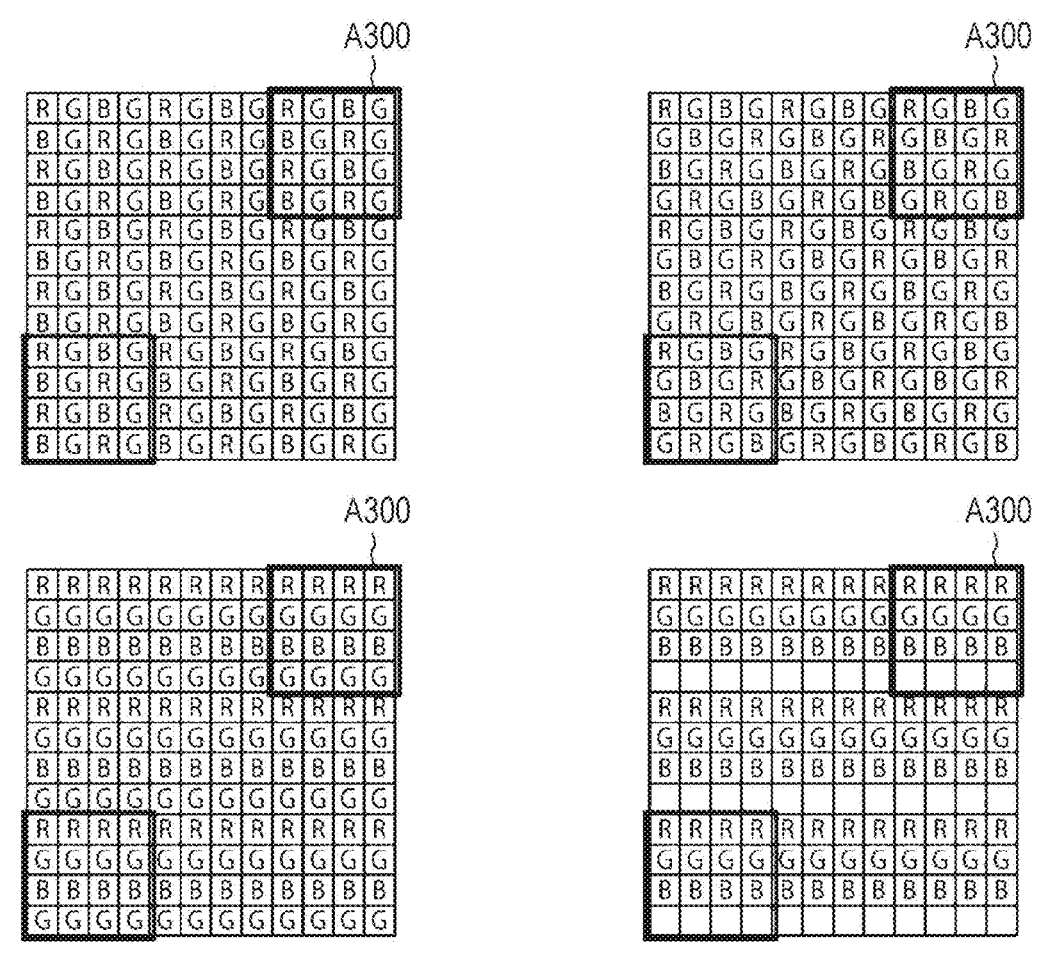

FIG. 31 is a diagram illustrating an example in which a polarizing filter equivalent to the area A300 is arranged to overlap each of the arrangement examples of FIGS. 22, 23, 24, and 27. In this manner, the arrangement of the polarizing filter and each color filter may be changed.

Figure 32:
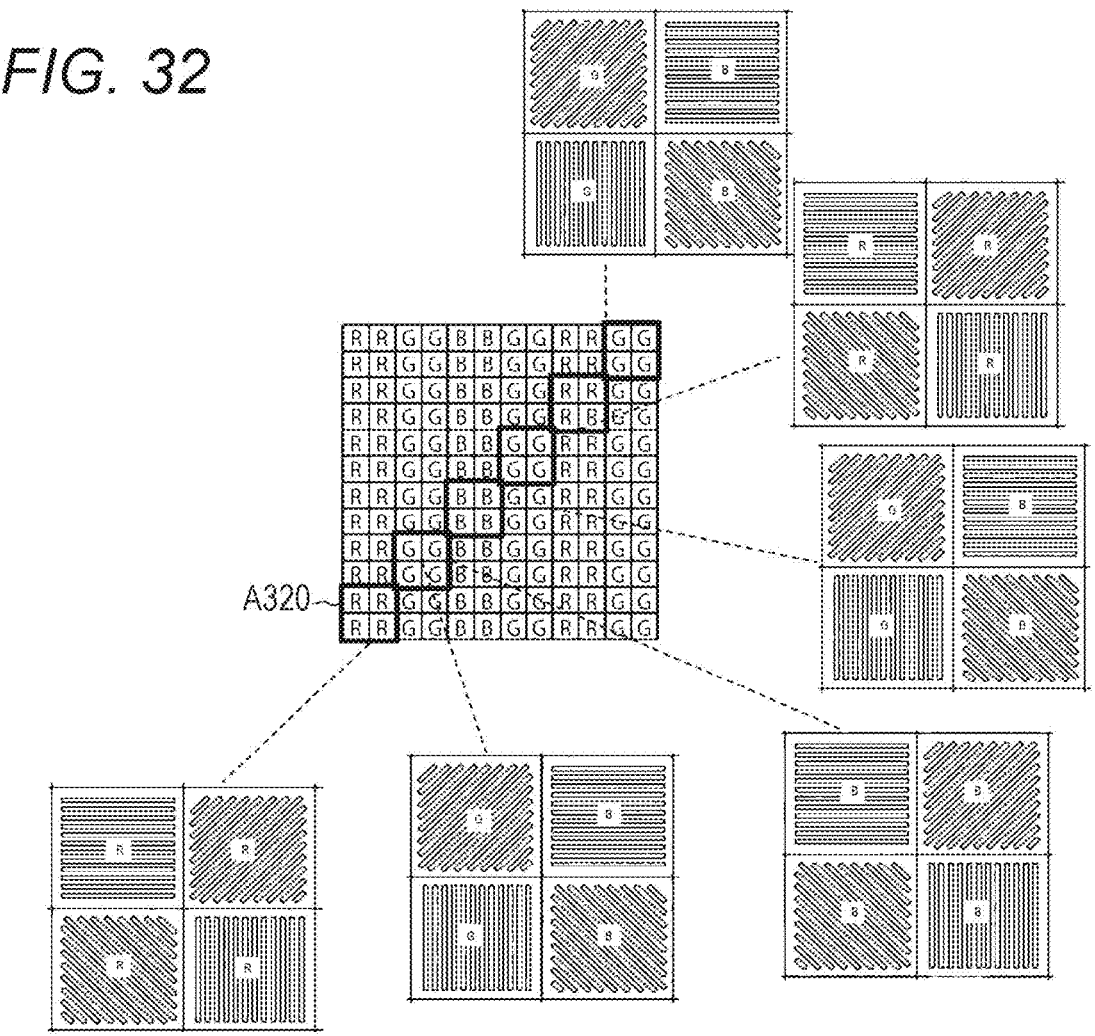
FIG. 32 is a diagram illustrating an example in which polarizing filters are further arranged on an arrangement example of FIG. 28.

FIG. 32 is a diagram illustrating an example in which polarizing filters are further arranged on the arrangement example of FIG. 28. This is an example in which each polarizing filter is arranged in a superimposed manner for each polarization area A320 for every 2×2 pixels. Therefore, all types of color information can be acquired with data of any period timing, and in a case where it is desired to remove reflection and perform recognition, it is possible to change the priority to read the polarized image (area A320).

Figure 33:
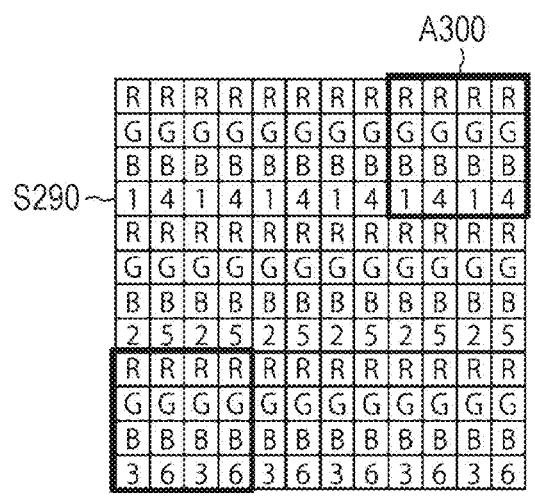
FIG. 33 is a diagram illustrating an example in which polarizing filters are further arranged on an arrangement example of FIG. 29.

FIG. 33 is a diagram illustrating an example in which polarizing filters are further arranged on the arrangement example of FIG. 29. This is an example in which each polarizing filter is arranged in a superimposed manner for each polarization area A300 for every 4×4 pixels.

Therefore, the pixel type determination unit 123a normally reads out the visible-light pixels R, B, and G, but can change the priority to read the spectral image (line S290) in a case where it is desired to identify the material of the object. Furthermore, it is possible to change the priority to read the polarized image (area A300) in a case where it is desired to remove reflection and perform recognition.

Figures 34, 35:
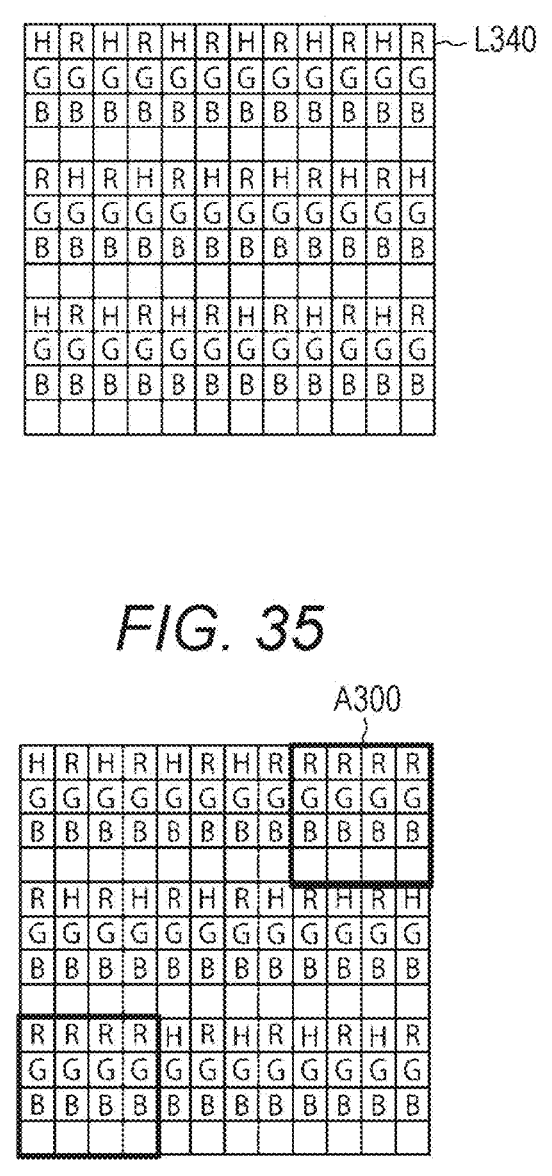

FIG. 34 is a diagram illustrating an example in which far-red pixels H having infrared filters are arranged in a part of the arrangement example of FIG. 27. In FIG. 34, the far-red pixels H and the R pixels are alternately arranged in a column L340 of the R pixels. Therefore, the pixel type determination unit 123a normally reads the visible-light pixels, but changes the priority to read the far-red pixels H in a case where it is desired to perform recognition in a dark place. For example, it is effective in a case of recognizing whether there is a person or a living thing in a dark region where there is no street light and the front light does not hit.

FIG. 35 is a diagram illustrating an example in which polarizing filters are further arranged on a part of the arrangement example of FIG. 24. In FIG. 35, the polarizing filter is further disposed in the area A300. Therefore, the pixel type determination unit 123a normally reads the visible-light pixels, but changes the priority to read the far-red pixels H in a case where it is desired to perform recognition in a dark place. For example, it is effective in a case of recognizing whether there is a person or a living thing in a dark region where there is no street light and the front light does not hit. Furthermore, the pixel type determination unit 123a normally reads out the visible-light pixels R, B, and G, but changes the priority to read the polarized image (area A300) in a case where it is desired to remove reflection and perform recognition. For example, in a case where the direction of the face of a driver of an oncoming vehicle that cannot be observed due to reflection by the windshield is recognized, the priority is changed so as to read the polarized image (area A300). Therefore, it is possible to suppress the reflection components and to suppress a decrease in the recognition rate.

Figure 36:
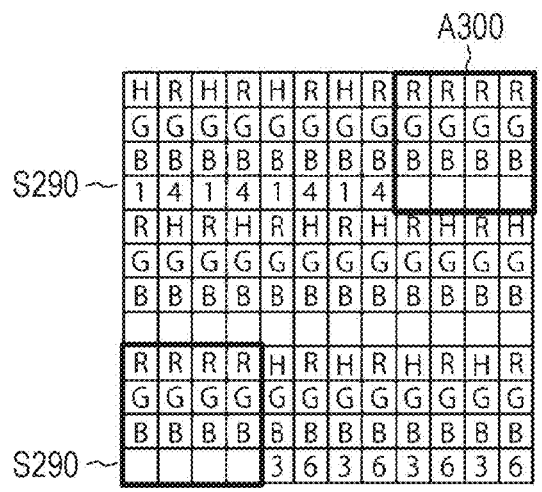
FIG. 36 is a diagram illustrating an example in which a part of the W pixel column in FIG. 35 is replaced with spectral pixels.

FIG. 36 is a diagram illustrating an example in which a part of the W pixel column in FIG. 35 is replaced with spectral pixels. In FIG. 36, the polarizing filter is further disposed in the area A300. Therefore, the pixel type determination unit 123a normally reads the visible-light pixels, but changes the priority to read the far-red pixels H in a case where it is desired to perform recognition in a dark place. For example, it is effective in a case of recognizing whether there is a person or a living thing in a dark region where there is no street light and the front light does not hit. Furthermore, the pixel type determination unit 123a normally reads out the visible-light pixels R, B, and G, but changes the priority to read the polarized image (area A300) in a case where it is desired to remove reflection and perform recognition. For example, in a case where the direction of the face of a driver of an oncoming vehicle that cannot be observed due to reflection by the windshield is recognized, the priority is changed so as to read the polarized image (area A300). Therefore, it is possible to suppress the reflection components and to suppress a decrease in the recognition rate. Furthermore, the pixel type determination unit 123a normally reads out the visible-light pixels R, B, and G, but can change the priority to read the spectral image (line S290) in a case where it is desired to identify the material of the object. For example, in a situation of emergency stop or avoidance, in a case where a person or a poster cannot be identified, the recognition rate can be improved by performing the identification using spectral information.

Figure 37:
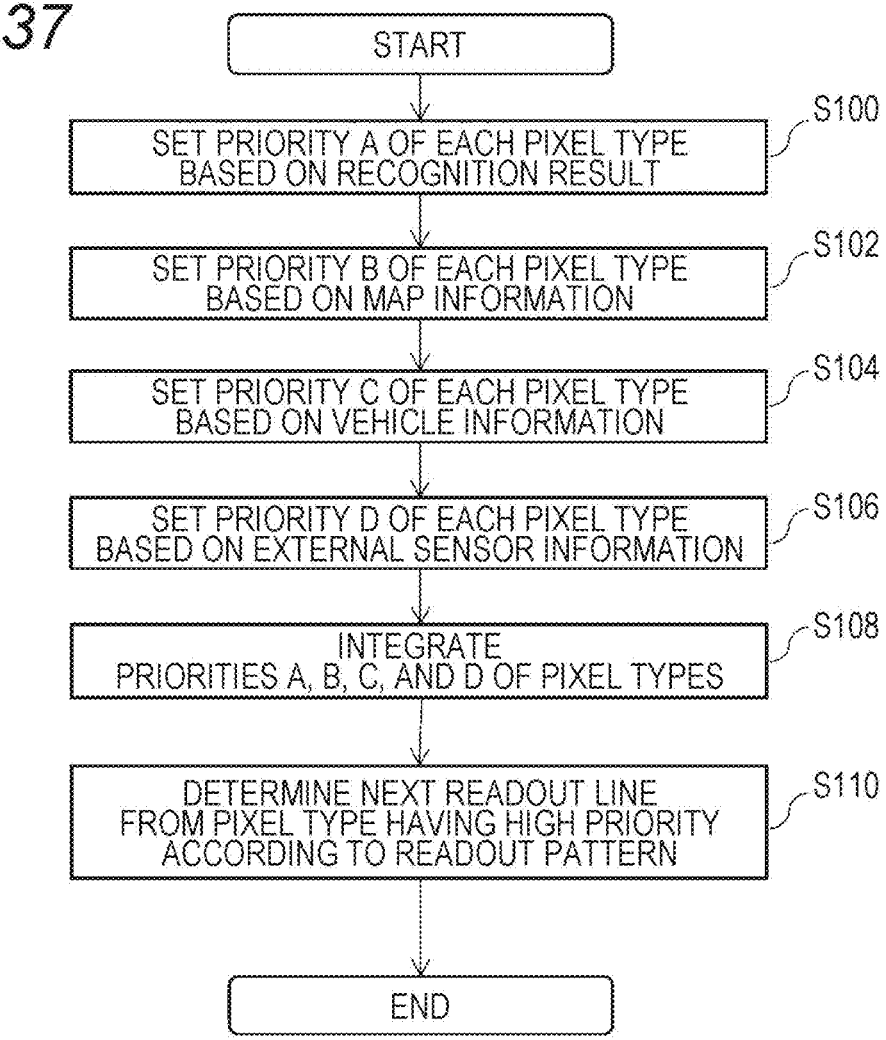
FIG. 37 is a flowchart illustrating a flow of processing of a readout pixel type determination unit.

FIG. 37 is a flowchart illustrating a flow of processing of the pixel type determination unit 123a.

First, the pixel type determination unit 123a sets the priority A for each of various pixels indicating which pixel type is prioritized on the basis of the recognition result of the recognition processing unit 12 using the pixel array information (step S100). For example, normally, the priority of the G pixel is set to be the highest. On the other hand, in a case where the recognition rate of the G pixel is decreased, the priorities of the R pixel and the B pixel are also set to be increased.

Next, the pixel type determination unit 123a sets the priority B for each of various pixels on the basis of the map information using the pixel array information (step S102). For example, in a case where a vehicle in the map information is positioned in a tunnel, the priorities of the infrared pixel H and the W pixel are set to be high. On the other hand, in a case where the vehicle is positioned at a flatland without an obstacle, the priority of the G pixel is set to be the highest. Furthermore, in a case where the vehicle is positioned in a downtown, the priority of the spectral pixel is increased so that the difference between a person and a fixed object becomes clearer.

Next, the pixel type determination unit 123a sets the priority C for each of various pixels on the basis of the vehicle information using the pixel array information (step S104). For example, the vehicle information includes information such as a speed and a traveling direction. During high-speed traveling, the pixel type determination unit 123a determines that, for example, the vehicle is traveling in a place where there is no person, and sets, for example, the priority of the G pixel to be the highest. On the other hand, during low-speed traveling, the priority of the spectral pixel is increased so that the difference between a person and a fixed object becomes clearer.

Furthermore, in a case where the direction of the vehicle is the direction in which the sun is inserted into the windshield, the priority of the polarizing pixel is increased.

Next, the pixel type determination unit 123a sets the priority D for each of various pixels on the basis of the external sensor information using the pixel array information (step S106). For example, the external sensor information includes, for example, information such as illuminance, temperature, and humidity. In a case where the illuminance is high, the pixel type determination unit 123a changes the priority of the polarizing pixel. On the other hand, in a case where the illuminance is low, the priorities of the infrared pixel H and the W pixel are increased.

Next, the pixel type determination unit 123a integrates the priorities A, B, C, and D (step S108), determines the next readout region from the pixel type having a high priority according to a readout pattern, and ends the processing.

As described above, according to the present embodiment, the reading unit 110 sets a readout pixel as a part of the pixel region of the pixel array unit 101 in which a plurality of pixels is arranged in a two-dimensional array, and controls the reading out of the pixel signal from the pixel included in the pixel region. At this time, the pixel type determination unit 123a sets the readout region, that is, the readout pixel, on the basis of color filter array information of the pixel region included in the pixel array information. Therefore, it is possible to select a pixel in which a color filter corresponding to a situation is arranged. Therefore, it is possible to suppress a decrease in the recognition rate of the recognition processing execution unit 124.

Second Embodiment (2-1. Application Example of Technology of Present Disclosure)

Figure 38:
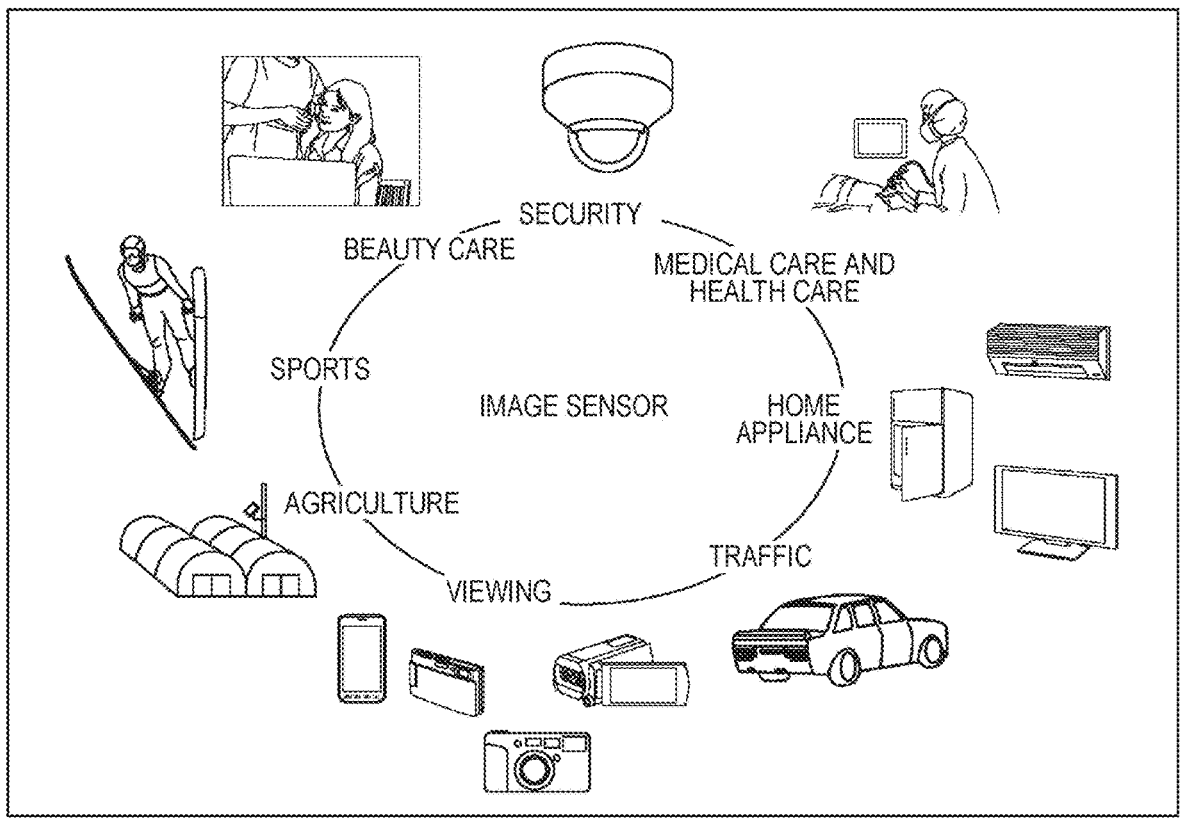
FIG. 38 is a diagram illustrating a usage example of using an information processing apparatus according to a first embodiment.

Next, as a second type of embodiment, an application example of the information processing apparatus 1a according to the first or second embodiment of the present disclosure will be described. FIG. 38 is a diagram illustrating a usage example of using the information processing apparatus 1a according to the first embodiment. Note that, in the following, in a case where it is not particularly necessary to distinguish, the information processing apparatus 1a will be described as a representative.

For example, the information processing apparatus 1a described above can be used in various cases where light such as visible light, infrared light, ultraviolet light, and X-rays is sensed and recognition processing is performed on the basis of a sensing result as follows.

A device that captures an image to be used for viewing, such as a digital camera or a portable device with a camera function.

A device used for traffic, such as an in-vehicle sensor that captures images of the front, rear, surroundings, inside, and the like of an automobile for safe driving such as automatic stop, recognition of a driver's state, and the like, a monitoring camera that monitors traveling vehicles and roads, and a distance measuring sensor that measures a distance between vehicles and the like.

A device used for home appliances such as a TV, a refrigerator, and an air conditioner in order to capture an image of a gesture of a user and operate the device according to the gesture.

A device used for medical care or health care, such as an endoscope or a device that performs angiography by receiving infrared light.

A device used for security, such as a monitoring camera for crime prevention or a camera for person authentication.

A device used for beauty care, such as a skin measuring instrument for imaging skin or a microscope for imaging a scalp.

A device used for sports, such as an action camera or a wearable camera for sports or the like.

A device used for agriculture, such as a camera for monitoring states of fields and crops.

(2-2. Application Example to Mobile Body)

The technology according to the present disclosure (present technology) can be applied to various products.

For example, the technology according to the present disclosure may be realized as a device mounted on any type of mobile body such as an automobile, an electric vehicle, a hybrid electric vehicle, a motorcycle, a bicycle, a personal mobility, an airplane, a drone, a ship, and a robot.

Figure 39:
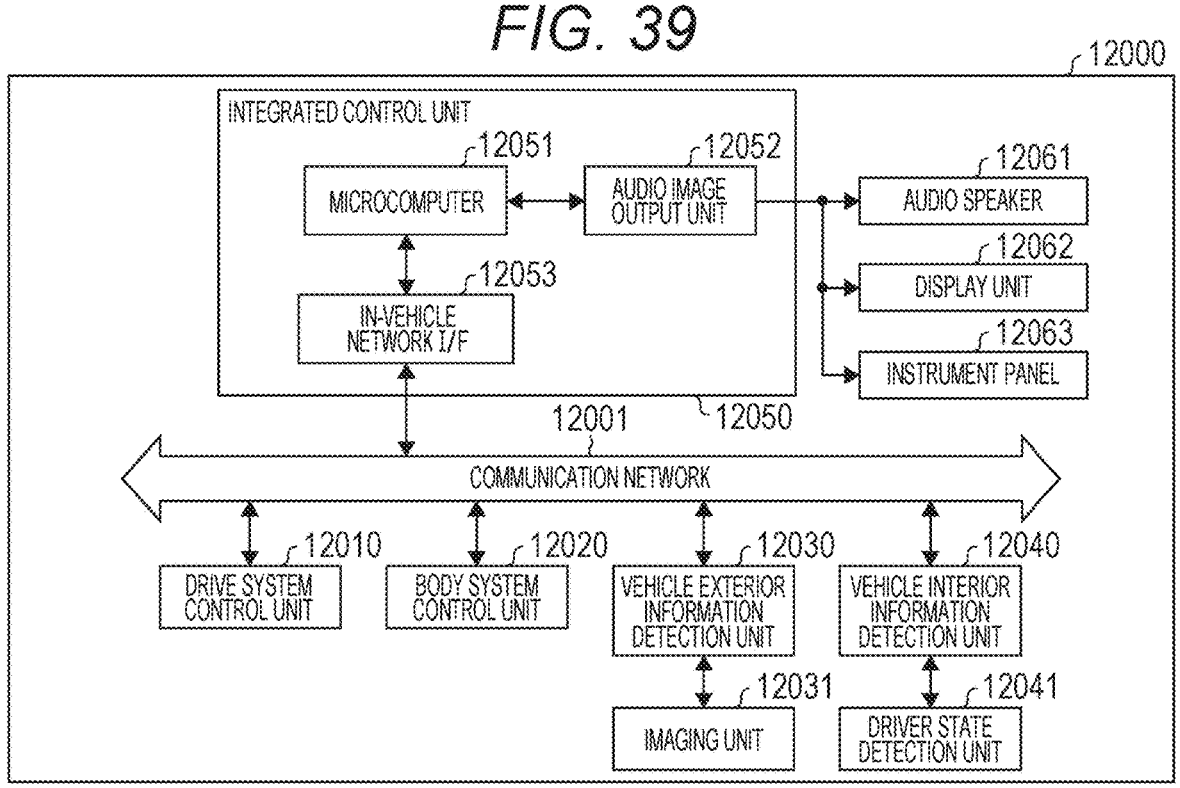
FIG. 39 is a block diagram illustrating an example of a schematic configuration of a vehicle control system.

FIG. 39 is a block diagram illustrating a schematic configuration example of a vehicle control system that is an example of a mobile body control system to which the technology according to the present disclosure is applied.

A vehicle control system 12000 includes a plurality of electronic control units connected via a communication network 12001. In the example illustrated in FIG. 41, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, an audio image output unit 12052, and an in-vehicle network interface (I/F) 12053 are illustrated.

The drive system control unit 12010 controls the operation of devices relating to the drive system of the vehicle according to various programs. For example, the drive system control unit 12010 functions as a control device of a driving force generation device for generating a driving force of the vehicle such as an internal combustion engine or a driving motor, a driving force transmission mechanism for transmitting the driving force to wheels, a steering mechanism for adjusting a steering angle of the vehicle, a braking device for generating a braking force of the vehicle, and the like.

The body system control unit 12020 controls the operations of various devices mounted on the vehicle body according to various programs. For example, the body system control unit 12020 functions as a control device of a keyless entry system, a smart key system, a power window device, or various lamps such as a headlamp, a back lamp, a brake lamp, a blinker, or a fog lamp. In this case, radio waves transmitted from a portable device that substitutes for a key or signals of various switches can be input to the body system control unit 12020. The body system control unit 12020 receives an input of these radio waves or signals, and controls a door lock device, a power window device, a lamp, and the like of the vehicle.

The vehicle exterior information detection unit 12030 detects information on the outside of the vehicle on which the vehicle control system 12000 is mounted. For example, an imaging unit 12031 is connected to the vehicle exterior information detection unit 12030. The vehicle exterior information detection unit 12030 causes the imaging unit 12031 to capture an image of the outside of the vehicle, and receives the captured image. The vehicle exterior information detection unit 12030 may perform object detection processing or distance detection processing of a person, a vehicle, an obstacle, a sign, a character on a road surface, or the like on the basis of the received image.

The imaging unit 12031 is a light sensor that receives light, and outputs an electric signal corresponding to the amount of received light. The imaging unit 12031 can output the electric signal as an image, or can output the electric signal as distance measurement information. Furthermore, the light received by the imaging unit 12031 may be visible light or invisible light such as infrared rays.

The vehicle interior information detection unit 12040 detects information on the inside of the vehicle. For example, a driver state detection unit 12041 that detects a state of the driver is connected to the vehicle interior information detection unit 12040. The driver state detection unit 12041 includes, for example, a camera that images the driver, and the vehicle interior information detection unit 12040 may calculate the degree of fatigue or the degree of concentration of the driver or may determine whether or not the driver is dozing off on the basis of the detection information input from the driver state detection unit 12041.

The microcomputer 12051 can calculate a control target value of the driving force generation device, the steering mechanism, or the braking device on the basis of the information on the inside or outside of the vehicle acquired by the vehicle exterior information detection unit 12030 or the vehicle interior information detection unit 12040, and output a control command to the drive system control unit 12010. For example, the microcomputer 12051 can perform cooperative control for the purpose of realizing functions of an advanced driver assistance system (ADAS) including collision avoidance or impact mitigation of the vehicle, follow-up traveling based on an inter-vehicle distance, vehicle speed maintenance traveling, collision warning of the vehicle, lane departure warning of the vehicle, or the like.

Furthermore, the microcomputer 12051 can perform cooperative control for the purpose of automated driving or the like in which the vehicle autonomously travels without depending on the operation of the driver by controlling the driving force generation device, the steering mechanism, the braking device, or the like on the basis of the information around the vehicle acquired by the vehicle exterior information detection unit 12030 or the vehicle interior information detection unit 12040.

Furthermore, the microcomputer 12051 can output a control command to the body system control unit 12020 on the basis of the information on the outside of the vehicle acquired by the vehicle exterior information detection unit 12030. For example, the microcomputer 12051 can perform cooperative control for the purpose of preventing glare, such as switching from a high beam to a low beam, by controlling the headlamp according to the position of a preceding vehicle or an oncoming vehicle detected by the vehicle exterior information detection unit 12030.

The audio image output unit 12052 transmits an output signal of at least one of the audio or the image to an output device capable of visually or audibly notifying information to an occupant of the vehicle or the outside of the vehicle. In the example of FIG. 36, an audio speaker 12061, a display unit 12062, and an instrument panel 12063 are illustrated as the output device. The display unit 12062 may include, for example, at least one of an on-board display or a head-up display.

Figure 40:
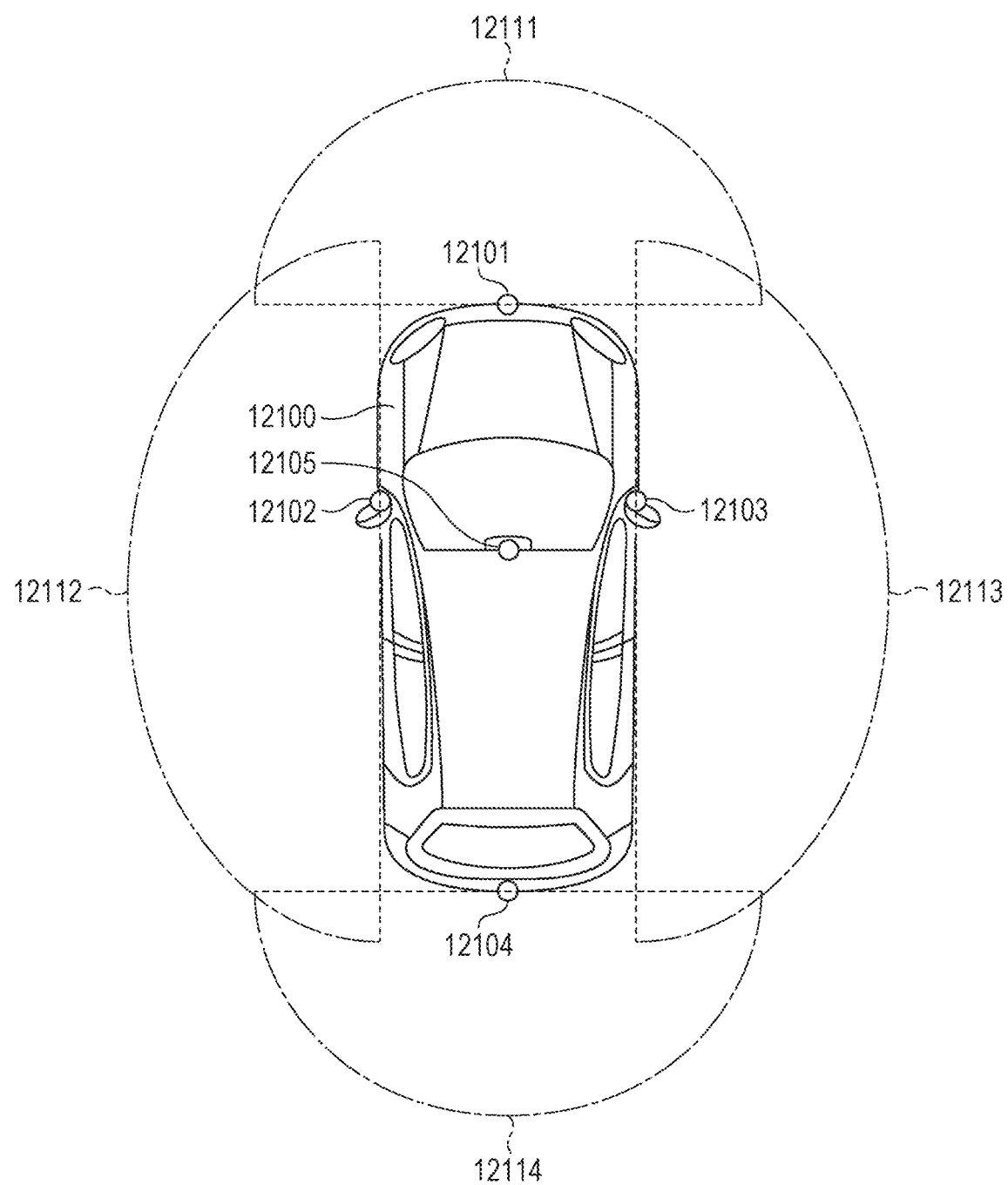
FIG. 40 is an explanatory diagram illustrating an example of installation positions of a vehicle exterior information detection unit and an imaging unit.

FIG. 40 is a diagram illustrating an example of an installation position of the imaging unit 12031.

In FIG. 40, a vehicle 12100 includes imaging units 12101, 12102, 12103, 12104, and 12105 as the imaging unit 12031.

The imaging units 12101, 12102, 12103, 12104, and 12105 are provided, for example, at positions such as a front nose, a side mirror, a rear bumper, a back door, and an upper portion of a windshield in a vehicle interior of the vehicle 12100. The imaging unit 12101 provided at the front nose and the imaging unit 12105 provided at the upper portion of the windshield in the vehicle interior mainly acquire images in front of the vehicle 12100. The imaging units 12102 and 12103 provided at the side mirrors mainly acquire images of the sides of the vehicle 12100. The imaging unit 12104 provided on the rear bumper or the back door mainly acquires an image behind the vehicle 12100. The front images acquired by the imaging units 12101 and 12105 are mainly used for detecting a preceding vehicle, a pedestrian, an obstacle, a traffic light, a traffic sign, a lane, or the like.

Note that FIG. 40 illustrates an example of imaging ranges of the imaging units 12101 to 12104. An imaging range 12111 indicates an imaging range of the imaging unit 12101 provided at the front nose, imaging ranges 12112 and 12113 respectively indicate imaging ranges of the imaging units 12102 and 12103 provided at the side mirrors, and an imaging range 12114 indicates an imaging range of the imaging unit 12104 provided at the rear bumper or the back door. For example, by superimposing image data captured by the imaging units 12101 to 12104, an overhead view image of the vehicle 12100 viewed from above is obtained.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, the microcomputer 12051 obtains a distance to each three-dimensional object in the imaging ranges 12111 to 12114 and a temporal change of the distance (relative speed with respect to the vehicle 12100) on the basis of the distance information obtained from the imaging units 12101 to 12104, and thereby can extract, as a preceding vehicle, the three-dimensional object traveling at a predetermined speed (for example, 0 km/h or more) in substantially the same direction as the vehicle 12100, in particular, the closest three-dimensional object on a traveling path of the vehicle 12100. Moreover, the microcomputer 12051 can set an inter-vehicle distance to be secured in advance in front of the preceding vehicle, and can perform automatic brake control (including follow-up stop control), automatic acceleration control (including follow-up start control), and the like. It is possible to perform cooperative control for the purpose of the automated driving or the like in which the vehicle autonomously travels without depending on the operation of the driver in this manner.

For example, on the basis of the distance information obtained from the imaging units 12101 to 12104, the microcomputer 12051 can classify three-dimensional object data relating to the three-dimensional objects into two-wheeled vehicles, ordinary vehicles, large vehicles, pedestrians, and other three-dimensional objects such as utility poles, extract the three-dimensional object data, and use the three-dimensional object data for automatic avoidance of obstacles. For example, the microcomputer 12051 identifies obstacles around the vehicle 12100 as obstacles that can be visually recognized by the driver of the vehicle 12100 and obstacles that are difficult to be visually recognized. Then, the microcomputer 12051 determines a collision risk indicating a risk of collision with each obstacle, and in a case where the collision risk is a set value or more and there is a possibility of collision, the microcomputer can perform driving assistance for collision avoidance by outputting an alarm to the driver via the audio speaker 12061 or the display unit 12062 or performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether or not a pedestrian is present in the captured images of the imaging units 12101 to 12104. Such pedestrian recognition is performed by, for example, a procedure of extracting feature points in the captured images of the imaging units 12101 to 12104 as infrared cameras, and a procedure of performing pattern matching processing on a series of feature points indicating the contour of the object to determine whether or not the object is a pedestrian. In a case where the microcomputer 12051 determines that a pedestrian is present in the captured images of the imaging units 12101 to 12104 and recognizes the pedestrian, the audio image output unit 12052 controls the display unit 12062 to display a square contour line for emphasis on the recognized pedestrian in a superimposed manner. Furthermore, the audio image output unit 12052 may control the display unit 12062 to display an icon or the like indicating a pedestrian at a desired position.

An example of the vehicle control system to which the technology according to the present disclosure can be applied has been described above. The technology according to the present disclosure can be applied to the imaging unit 12031 and the vehicle exterior information detection unit 12030 among the configurations described above. Specifically, for example, the sensor unit 10 of the information processing system 1 is applied to the imaging unit 12031, and the recognition processing unit 12 is applied to the vehicle exterior information detection unit 12030. The recognition result output from the recognition processing unit 12 is delivered to the integrated control unit 12050 via the communication network 12001, for example.

As described above, by applying the technology according to the present disclosure to the imaging unit 12031 and the vehicle exterior information detection unit 12030, it is possible to execute recognition of an object at a short distance and recognition of an object at a long distance, respectively, and it is possible to perform recognition of an object at a short distance with high simultaneity, so that more reliable driving assistance can be performed.

Note that, the effects described in the specification are merely examples and are not limited, and may have other effects.

Note that the present technology can have the following configurations.

(1) An information processing apparatus including:
a reading unit that sets a readout pixel as a part of a pixel region in which a plurality of pixels is arranged in a two-dimensional array, and controls reading out of a pixel signal from the pixel included in the pixel region; and
a setting unit that sets the readout pixel on the basis of color filter array information of the pixel region.

(2) The information processing apparatus described in (1), in which the setting unit sets the readout pixel on the basis of external information.

(3) The information processing apparatus described in (1), in which the external information is at least one of a recognition result, map information, vehicle information, or external sensor information.

(4) The information processing apparatus described in (1), in which the setting unit sets priorities respectively to at least two kinds of information among a recognition result, map information, vehicle information, and external sensor information, and sets the readout pixel on the basis of the plurality of set priorities.

(5) The information processing apparatus described in (4), in which a polarizing filter is arranged on at least one of the plurality of pixels, and the setting unit sets a priority of the pixel on which the polarizing filter is arranged, on the basis of at least one of the recognition result, the map information, the vehicle information, or the external sensor information.

(6) The information processing apparatus described in (5), in which a spectral filter is arranged on at least one of the plurality of pixels, and the setting unit sets a priority of the pixel on which the spectral filter is arranged, on the basis of at least one of the recognition result, the map information, the vehicle information, or the external sensor information.

(7) The information processing apparatus described in (5), in which an infrared filter is arranged on at least one of the plurality of pixels, and the setting unit sets a priority of the pixel on which the infrared filter is arranged, on the basis of at least one of the recognition result, the map information, the vehicle information, or the external sensor information.

(8) An information processing system including:
a sensor unit in which a plurality of pixels is arranged in a two-dimensional array;
a sensor control unit that controls the sensor unit; and
a recognition processing unit,
in which the sensor control unit has
a reading unit that sets a readout pixel as a part of a pixel region in which a plurality of pixels is arranged in a two-dimensional array, and controls reading out of a pixel signal from the pixel included in the pixel region, and
the recognition processing unit has
a setting unit that sets the readout pixel on the basis of color filter array information of the pixel region.

(9) An information processing method including:
a reading step of setting a readout pixel as a part of a pixel region in which a plurality of pixels is arranged in a two-dimensional array, and controlling reading out of a pixel signal from the pixel included in the pixel region; and
a setting step of setting the readout pixel on the basis of color filter array information of the pixel region.

(10) A program causing a computer to execute:
a reading step of setting a readout pixel as a part of a pixel region in which a plurality of pixels is arranged in a two-dimensional array, and controlling reading out of a pixel signal from the pixel included in the pixel region; and
a setting step of setting the readout pixel on the basis of color filter array information of the pixel region.

REFERENCE SIGNS LIST

1 Information processing system
2 Information processing apparatus
10 Sensor unit
12 Recognition processing unit
110 Reading unit
120 Feature quantity calculation unit
123a Readout pixel type determination unit (setting unit)
124 Recognition processing execution unit

The invention claimed is:

1. An information processing apparatus system:
processing circuitry configured to:
set a pixel readout region in which a plurality of pixels are arranged in a two-dimensional array;
prioritize a readout pixel included in the pixel readout region on a basis of filter array information of the pixel readout region; and
control reading out of a pixel signal from the readout pixel included in the pixel readout region.

2. The information processing apparatus according to claim 1, wherein the processing circuitry is configured to prioritize the readout pixel on a basis of external information.

3. The information processing apparatus according to claim 2, wherein the external information is at least one of a recognition result, map information, vehicle information, or external sensor information.

4. The information processing apparatus according to claim 3, wherein
the filter array information includes color filter information on at least one of a red filter (R), a green filter (G), a blue filter (B), or a white filter (W) arranged in the plurality of pixels, and
the processing circuitry is configured to prioritize the readout pixel on a basis of the color filter information and the external information.

5. The information processing apparatus according to claim 3, wherein
the filter array information includes filter type information on at least one of a spectral filter, an infrared filter, or a polarizing filter, and
the processing circuitry is configured to prioritize the readout pixel on a basis of the filter type information and the external information.

6. The information processing apparatus according to claim 3, wherein
the filter array information includes:
color filter information on at least one of a red filter (R), a green filter (G), a blue filter (B), or a white filter (W) arranged in the plurality of pixels, and
filter type information on at least one of a spectral filter, an infrared filter, or a polarizing filter, and
the processing circuitry is configured to prioritize the readout pixel on a basis of the color filter information, the filter type information, and the external information.

7. The information processing apparatus according to claim 1, wherein the processing circuitry is configured to:
set priorities respectively to at least two kinds of information among a recognition result, map information, vehicle information, and external sensor information, and
prioritize the readout pixel on a basis of the plurality of set priorities.

8. The information processing apparatus according to claim 7, wherein
a polarizing filter is arranged on at least one of the plurality of pixels, and
the processing circuitry is configured to set a priority of the pixel on which the polarizing filter is arranged on a basis of at least one of the recognition result, the map information, the vehicle information, or the external sensor information.

9. The information processing apparatus according to claim 8, wherein
a spectral filter is arranged on at least one of the plurality of pixels, and
the processing circuitry is configured to set a priority of the pixel on which the spectral filter is arranged, on a basis of at least one of the recognition result the map information, the vehicle information, or the external sensor information.

10. The information processing apparatus according to claim 8, wherein
an infrared filter is arranged on at least one of the plurality of pixels, and
the processing circuitry is configured to set a priority of the pixel on which the infrared filter is arranged on a basis of at least one of the recognition result, the map information, the vehicle information, or the external sensor information.

11. The information processing apparatus according to claim 1, wherein the processing circuitry is configured to read the filter array information from a storage.

12. The information processing apparatus according to claim 1, wherein the filter array information includes information on a filter arranged in the plurality of pixels.

13. The information processing apparatus according to claim 12, wherein the information on the filter includes information on at least one of a type or a direction of the filter.

14. The information processing apparatus according to claim 13, wherein the type includes at least one of a red filter (R), a green filter (G), a blue filter (B), a white filter (W), a spectral filter, an infrared filter, or a polarizing filter.

15. The information processing apparatus according to claim 14, wherein the direction includes a direction of the polarizing filter.

16. The information processing apparatus according to claim 13, wherein the direction includes a direction of a polarizing filter.

17. An information processing system comprising:
a sensor in which a plurality of pixels is arranged in a two-dimensional array;
a recognition processing circuitry configured to prioritize a readout pixel included in the plurality of pixels on a basis of filter array information of the pixels;
a sensor control processing circuitry configured to control reading out of a pixel signal from the readout pixel included in the plurality of pixels.

18. An information processing method comprising:
setting, via processing circuitry, a pixel readout region in which a plurality of pixels are arranged in a two-dimensional array:
prioritizing, via the processing circuitry, a readout pixel included in the pixel readout region on a basis of filter array information of the pixel readout region; and
controlling, via the processing circuitry, reading out of a pixel signal from the readout pixel included in the pixel readout region.

19. A non-transitory computer readable medium storing a program which when executed by a computer causes the computer to execute a method, the method comprising:
setting a pixel readout region in which a plurality of pixels are arranged in a two-dimensional array;
prioritizing a readout pixel included in the pixel readout region on a basis of filter array information of the pixel readout region; and
controlling reading out of a pixel signal from the readout pixel included in the pixel readout region.

* * * * *